(12) United States Patent
Baltar et al.

(10) Patent No.: US 10,594,531 B2
(45) Date of Patent: Mar. 17, 2020

(54) FILTER BANKS AND METHODS FOR OPERATING FILTER BANKS

(71) Applicant: Technische Universität München, Munich (DE)

(72) Inventors: Leonardo Gomes Baltar, Munich (DE); Israa Slim, Munich (DE); Josef A. Nossek, Iffeldorf (DE)

(73) Assignee: Technische Universität München, München (DE)

( * ) Notice: Subject to any disclaimer, the term of this patent is extended or adjusted under 35 U.S.C. 154(b) by 0 days.

(21) Appl. No.: 16/076,957

(22) PCT Filed: Dec. 16, 2016

(86) PCT No.: PCT/EP2016/081541
§ 371 (c)(1),
(2) Date: Aug. 9, 2018

(87) PCT Pub. No.: WO2017/137126
PCT Pub. Date: Aug. 17, 2017

(65) Prior Publication Data
US 2019/0052499 A1 Feb. 14, 2019

(30) Foreign Application Priority Data

Feb. 9, 2016 (EP) ..................................... 16154802

(51) Int. Cl.
*H04L 27/26* (2006.01)
(52) U.S. Cl.
CPC ................................ *H04L 27/264* (2013.01)
(58) Field of Classification Search
CPC ..... H04L 27/2627–2633; H04L 27/264; H04L 27/2644; H04L 27/2649–2652
See application file for complete search history.

(56) References Cited

U.S. PATENT DOCUMENTS

| | | | | |
|---|---|---|---|---|
| 4,800,572 A | * | 1/1989 | Nossek | .................... H04L 27/01 375/232 |
| 7,099,396 B1 | * | 8/2006 | Combelles | .......... H04L 27/2698 370/210 |

(Continued)

OTHER PUBLICATIONS

Dandach et al., "Design Method of OFDM/OQAM Systems Using a Weighted Time-Frequency Localization Criterion," 18th European Signal Processing Conference (2010).

(Continued)

*Primary Examiner* — James M Perez
(74) *Attorney, Agent, or Firm* — Marshall, Gerstein & Borun LLP

(57) ABSTRACT

The disclosure refers to a synthesis filter bank, comprising: a transform module which is configured to receive a plurality of input signals, transform the plurality of input signals, and output a plurality of transformed signals, a plurality of filter modules, which are coupled to the transform module, and wherein each filter module of the plurality of filter modules is configured to receive two transformed signals from the transform module, process the two received transformed signals and output two processed signals, and a parallel-to-serial module which is coupled to the plurality of filter modules and which is configured to receive the processed signals from the plurality of filter modules, combine the received processed signals and output a combined signal. Furthermore, an analysis filter bank, a filter bank and methods for operating a synthesis filter bank and for operating an analysis filter bank are disclosed.

33 Claims, 25 Drawing Sheets

(56) References Cited

U.S. PATENT DOCUMENTS

Figure 1:
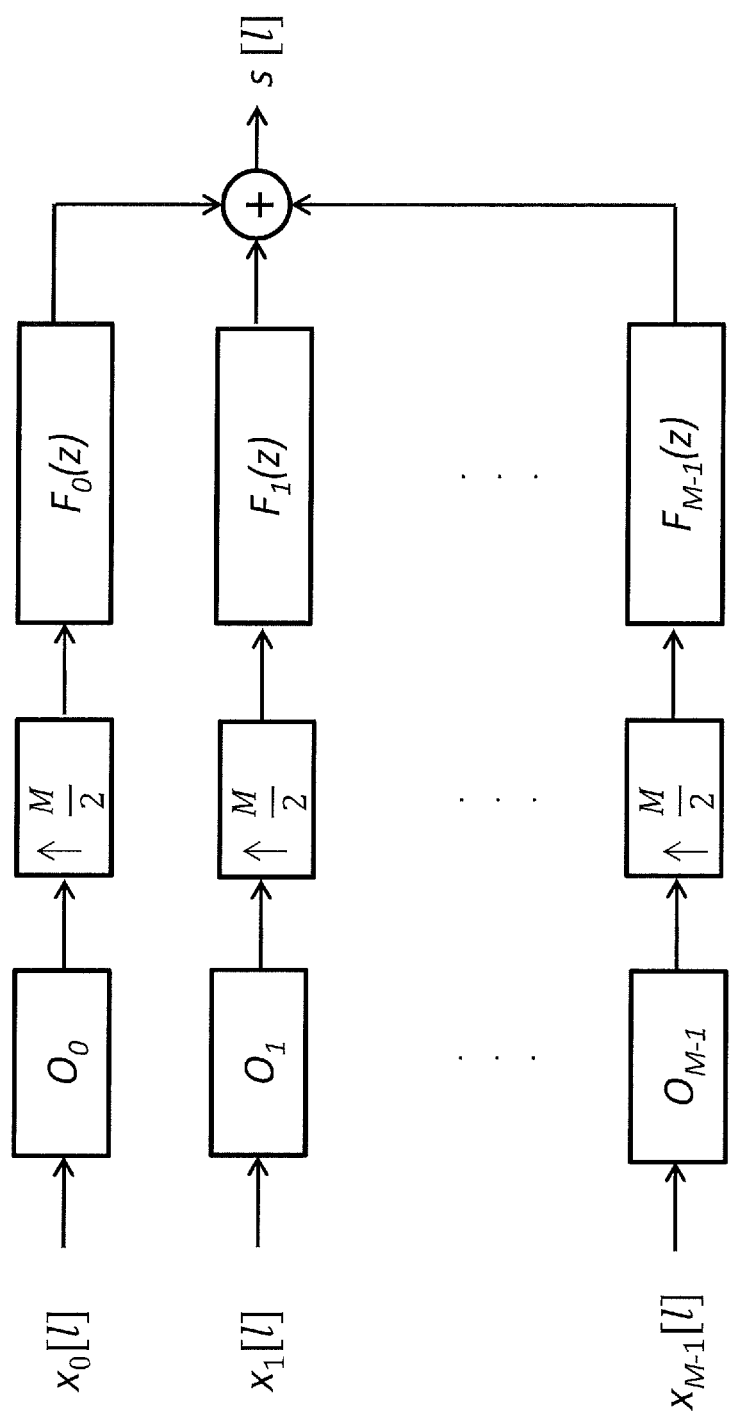

| | | | | |
|---|---|---|---|---|
| 7,499,496 | B2* | 3/2009 | Fujii | H04L 27/2621 370/208 |
| 7,609,611 | B1* | 10/2009 | Siohan | H04J 4/005 370/208 |
| 7,724,835 | B2* | 5/2010 | Naguib | H04L 1/0618 375/267 |
| 8,406,323 | B2* | 3/2013 | Huang | H04L 27/265 375/260 |
| 8,581,768 | B1* | 11/2013 | Pagnanelli | H03M 3/30 341/143 |
| 8,743,982 | B2* | 6/2014 | Bellanger | H04L 27/2652 375/130 |
| 9,166,858 | B2* | 10/2015 | Dandach | H04L 27/2631 |
| 9,209,936 | B1* | 12/2015 | Jia | H04L 1/0054 |
| 9,240,918 | B2* | 1/2016 | Siohan | H04L 27/2633 |
| 9,479,381 | B2* | 10/2016 | Siohan | H04L 1/0668 |
| 9,621,394 | B2* | 4/2017 | Siohan | H04L 27/264 |
| 9,813,276 | B2* | 11/2017 | Jungnickel | H04L 25/03828 |
| 9,923,752 | B2* | 3/2018 | Nossek | H04L 27/38 |
| 10,009,078 | B2* | 6/2018 | Asakura | G01S 7/295 |
| 10,027,520 | B2* | 7/2018 | Zhu | H04L 27/2614 |
| 10,057,097 | B2* | 8/2018 | Lin | H04L 27/2602 |
| 10,148,413 | B2* | 12/2018 | Cassiau | H04L 7/0033 |
| 10,166,388 | B2* | 1/2019 | Isik | A61N 1/36036 |
| 10,177,947 | B2* | 1/2019 | Agee | H04L 25/08 |
| 2002/0150038 | A1* | 10/2002 | Sumasu | H04L 27/2614 370/208 |
| 2002/0181388 | A1* | 12/2002 | Jain | H04L 27/0004 370/208 |
| 2003/0063680 | A1* | 4/2003 | Nedic | H04L 25/03159 375/260 |
| 2003/0076899 | A1* | 4/2003 | Kumar | H04L 5/06 375/316 |
| 2003/0123383 | A1* | 7/2003 | Korobkov | H04L 5/0037 370/208 |
| 2003/0147655 | A1* | 8/2003 | Shattil | H04L 27/00 398/182 |
| 2003/0231714 | A1* | 12/2003 | Kjeldsen | H04B 1/69 375/259 |
| 2004/0013211 | A1* | 1/2004 | Lindskog | H04B 7/0669 375/347 |
| 2004/0022183 | A1* | 2/2004 | Li | H04L 1/0618 370/210 |
| 2004/0120274 | A1* | 6/2004 | Petre | H04B 7/04 370/320 |
| 2005/0047513 | A1* | 3/2005 | Vitenberg | H04L 27/0004 375/260 |
| 2005/0152473 | A1* | 7/2005 | Maltsev | H04L 12/56 375/299 |
| 2005/0259727 | A1* | 11/2005 | Benvenuto | H04L 25/03146 375/233 |
| 2007/0092018 | A1* | 4/2007 | Fonseka | H04L 1/0054 375/265 |
| 2007/0211786 | A1* | 9/2007 | Shattil | H04B 1/707 375/141 |
| 2009/0110033 | A1* | 4/2009 | Shattil | H04B 1/7174 375/141 |
| 2009/0198753 | A1* | 8/2009 | Benjelloun Touimi | G10L 19/0204 708/313 |
| 2009/0207926 | A1* | 8/2009 | Huang | H04L 27/2633 375/260 |
| 2011/0142152 | A1* | 6/2011 | Bellanger | H04L 27/2634 375/261 |
| 2012/0127953 | A1* | 5/2012 | Kawamura | H04B 7/0413 370/330 |
| 2012/0189036 | A1* | 7/2012 | Bellanger | H04L 27/2631 375/146 |
| 2012/0243625 | A1* | 9/2012 | Berg | H04L 25/022 375/260 |
| 2012/0269234 | A1* | 10/2012 | Zhang | H04L 5/0007 375/143 |
| 2014/0064407 | A1* | 3/2014 | Dandach | H04L 27/2631 375/298 |
| 2014/0153675 | A1* | 6/2014 | Dandach | H04L 27/2684 375/340 |
| 2014/0169501 | A1* | 6/2014 | Nazarathy | H03H 17/0266 375/316 |
| 2014/0286384 | A1* | 9/2014 | Mestre Pons | H04L 27/01 375/232 |
| 2014/0348252 | A1* | 11/2014 | Siohan | H04L 1/0668 375/261 |
| 2014/0348268 | A1* | 11/2014 | Siohan | H04L 27/2633 375/298 |
| 2015/0063507 | A1* | 3/2015 | Dore | H04L 25/03159 375/348 |
| 2015/0092885 | A1* | 4/2015 | Li | H04L 27/2631 375/296 |
| 2015/0146770 | A1* | 5/2015 | Dore | H04L 25/0204 375/232 |
| 2015/0171950 | A1* | 6/2015 | Phan Huy | H04B 7/0697 370/329 |
| 2015/0180697 | A1* | 6/2015 | Phan Huy | H04B 7/0669 375/267 |
| 2015/0215776 | A1* | 7/2015 | Moradi | H04L 1/707 380/270 |
| 2015/0304144 | A1* | 10/2015 | Siohan | H04L 27/264 375/295 |
| 2015/0304146 | A1* | 10/2015 | Yang | H04L 5/0066 370/329 |
| 2016/0013961 | A1* | 1/2016 | Dore | H04L 27/264 375/316 |
| 2016/0191218 | A1* | 6/2016 | Bala | H04L 5/0007 370/203 |
| 2016/0204822 | A1* | 7/2016 | Yu | H04B 1/40 375/219 |
| 2016/0211998 | A1* | 7/2016 | Sun | H04L 27/264 |
| 2016/0235987 | A1* | 8/2016 | Isik | A61N 1/36038 |
| 2016/0380689 | A1* | 12/2016 | Sun | H04L 1/206 370/330 |
| 2017/0026205 | A1* | 1/2017 | Agee | H04L 25/08 |
| 2017/0078134 | A1* | 3/2017 | Nossek | H04L 27/38 |
| 2017/0134203 | A1* | 5/2017 | Zhu | H04B 7/0456 |
| 2017/0141943 | A1* | 5/2017 | Nazarathy | H04J 11/0023 |
| 2017/0170838 | A1* | 6/2017 | Pagnanelli | H03L 7/191 |
| 2017/0201317 | A1* | 7/2017 | Lee | H04B 7/26 |
| 2017/0302408 | A1* | 10/2017 | Dore | H04L 1/0668 |
| 2017/0310505 | A1* | 10/2017 | Nadal | H04L 25/0212 |
| 2017/0310527 | A1* | 10/2017 | Dore | H04L 27/265 |
| 2017/0331536 | A1* | 11/2017 | Cassiau | H04B 7/0456 |
| 2017/0366222 | A1* | 12/2017 | Nadal | H04L 27/2698 |
| 2018/0019905 | A1* | 1/2018 | Zhu | H04B 7/0452 |
| 2019/0052499 | A1* | 2/2019 | Baltar | H04L 27/264 |

OTHER PUBLICATIONS

International Search Report and Written Opinion from International Application No. PCT/EP2016/081541 dated Jan. 31, 2017.

* cited by examiner

FILTER BANKS AND METHODS FOR OPERATING FILTER BANKS

CROSS-REFERENCE TO RELATED APPLICATIONS

This is the U.S. national phase of PCT/EP2016/081541, filed Dec. 16, 2016, which claims the benefit of European Patent Application No. 16154802.9, filed Feb. 9, 2016.

The disclosure relates to filter banks and methods for operating filter banks.

BACKGROUND

Filter banks (FBs) play an important role in a number of digital signal processing (DSP) applications. They are usually employed in two basic configurations: First, a broadband signal is decomposed into its narrowband components, with the so called Analysis Filter Bank (AFB), for further processing and then the broadband signal is reconstructed back with the help of the Synthesis Filter Bank (SFB). In the second configuration, many narrowband signals are combined into one broadband signal with the SFB and then are reconstructed again with the AFB. The first configuration is usually called Sub-band Coding (SBC) and involves applications like, for example, signal compression, adaptive sub-band processing, channel equalization and spectrum sensing. The second configuration is the so called transmultiplexer (TMUX) and it is mainly applied to wired and wireless communications systems, where a number of data streams of one or more users are combined into one broadband signal to be transmitted via some medium and in the receiver, the different streams are then recovered. Modulated Filter Banks (MFB) are between the most popular FB classes because they have implementation structures with very low computational complexity.

The most prominent use of MFBs is in multicarrier modulation schemes. Those schemes are frequently called Filter Bank based Multicarrier (FBMC). The most trivial FBMC system is the so called Orthogonal Frequency Division Multiplexing (OFDM). OFDM utilizes a trivial prototype filter (all ones) and does not achieve maximum spectral efficiency due to the cyclic prefix. OFDM has been used in different wired and wireless standards, like ADSL, VDSL, WiFi and LTE, the 4th Generation of cellular systems. In the discussions of future mobile communications standards, more specifically the 5th Generation (5G), more general implementations of FBMC systems are under consideration. One of the candidate schemes is FBMC with the symbols in each subcarrier using Offset Quadrature Amplitude Modulation (OQAM) mapping.

SUMMARY

It is object of the disclosure to provide improved technologies for filter banks, in particular the processing or computational efficiency shall be improved.

A synthesis filter bank according to claim 1, an analysis filter bank according to claim 7, a filter bank according to claim 12, a method for operating a synthesis filter bank according to claim 13 and a method for operating an analysis filter bank according to claim 14 are provided. Further embodiments are subject matter of dependent claims.

In one aspect, a synthesis filter bank is disclosed, the synthesis filter bank comprises a transform module which is configured to receive a plurality of input signals, transform the plurality of input signals, and output a plurality of transformed signals, a plurality of filter modules, which are coupled to the transform module, and wherein each filter module of the plurality of filter modules is configured to receive two transformed signals from the transform module, process the two received transformed signals and output two processed signals, and a parallel-to-serial module which is coupled to the plurality of filter modules and which is configured to receive the processed signals from the plurality of filter modules, combine the received processed signals and output a combined signal.

In another aspect, an analysis filter bank is disclosed. The analysis filter bank comprises a serial-to-parallel module which is configured to receive an input signal and divide the received input signal into a plurality of output signals, a plurality of filter modules which are coupled to the serial-to-parallel module, wherein each filter module of the plurality of filter modules is configured to receive two output signals from the serial-to-parallel module, process the two received output signals and output two processed signals, and a transform module which is coupled to the plurality of filter modules and which is configured to receive the processed signals, transform the plurality of processed signals, and output a plurality of transformed signals.

Further, a filter bank comprising a synthesis filter and an analysis filter bank is disclosed. The analysis filter bank and the synthesis filter bank can be arranged in any order in the filter bank. For example, a synthesis filter bank may receive a plurality of input signals. An output of the synthesis filter bank can be provided as input to the analysis filter bank which outputs a plurality of signals. Alternatively, an input may be first received by the analysis filter bank, and the outputs of the analysis filter bank may be provided as inputs to the synthesis filter bank in order to output a signal.

In a further aspect, a method for operating a synthesis filter bank is provided, comprising: receiving a plurality of input signals by a transform module, transforming, by the transform module, the plurality of input signals, outputting, by the transform module, a plurality of transformed signals, receiving, by a plurality of filter modules which are coupled to the transform module, the plurality of transformed signals, wherein each filter module of the plurality of filter modules is configured to receive two transformed signals from the transform module, processing, by each of the plurality of filter modules, the two received transformed signals, outputting, by each of the plurality of filter modules, two processed signals, receiving, by a parallel-to-serial module which is coupled to the plurality of filter modules, the processed signals, combining, by the parallel-to-serial module, the received processed signals, and outputting, by the parallel-to-serial module, a combined signal.

In yet another aspect, a method for operating an analysis filter bank is disclosed, comprising: receiving, by a serial-to-parallel module, an input signal, dividing, by the serial-to-parallel module, the received input signal into a plurality of output signals, receiving, by a plurality of filter modules which are coupled to the serial-to-parallel module, the plurality of output signals, wherein each filter module of the plurality of filter modules is configured to receive two output signals from the serial-to-parallel module, processing, by each of the plurality of filter modules, the two received output signals, outputting, by each of the plurality of filter modules, two processed signals, receiving, by a transform module which is coupled to the plurality of filter modules, the processed signals, transforming, by the transform module, the plurality of processed signals, and outputting, by the transform module, a plurality of transformed signals.

The plurality of filter modules may be designed from an orthogonal prototype filter, wherein each filter module comprises a first filter and a second filter, wherein the second filter is a power complementary filter of the first filter such that the two received transformed signals are processed simultaneously. The filter modules may be implemented as a finite impulse response filter. In this case a single finite impulse response (FIR) low-pass filter, the so-called prototype filter, needs to be designed and the other filters of the plurality of filter modules can be obtained by decomposing it in its polyphase components, which can be from types 1, 2 or 3. The prototype filter may be a prototype filter with linear phase, i.e. with symmetrical impulse response.

For the synthesis filter bank and/or for the analysis filter band, the transform module may be configured to provide a linear transform of the received signals. The transform module may be a Fourier transform module configured to perform a discrete Fourier transform (DFT) of received signals in a computationally efficient manner, for example by employing a fast Fourier transform (FFT) algorithm. Alternatively, the transform module may be an inverse Fourier transform module configured to perform an inverse discrete Fourier transform (IDFT) of received signals in a computationally efficient manner, for example by employing an inverse fast Fourier transform (IFFT) algorithm. In case the polyphase decomposition is of type 1, an inverse Fourier transform module may be employed in the synthesis and/or analysis filter bank. If the polyphase decomposition is of type 2 or 3, a Fourier transform module may be employed in the synthesis and/or analysis filter bank.

The synthesis filter bank and/or the analysis filter bank may be configured to receive a digital signal which may be represented by a complex number. The digital signal may contain samples which may be real numbers, like voice, audio, images or videos. In those cases, a real valued prototype filter may be modulated either with sines or cosines. It is worth noting that a prototype filter may be real valued and a modulation of it may be complex valued.

For example, in wired and wireless communications, the information to be transmitted usually modulates the amplitude and the phase of a carrier wave. The digital signal may be represented by complex numbers to convey both amplitude and phase information.

For each of the plurality of filter modules of the synthesis filter bank, one of the two processed signals may be complex conjugated before it is received by the parallel-to-serial module.

For each of the plurality of filter modules of the synthesis filter bank, for each even time index a negative sign may applied to one of the two processed signals before it is received by the parallel-to-serial module, e.g. by multiplying the signal with a factor $(-1)^{m+1}$, wherein m is the time index. A sign of the processed signal which is complex conjugated may be turned negative before it is received by the parallel-to-serial module.

A number of the transformed signals which are received by the plurality of filter modules of the synthesis filter bank may be half the number of input signals received by the transform module.

For each of the plurality of filter modules of the synthesis filter bank, one of the two transformed signals may be delayed in time before being received by the respective filter module, e.g. by T/2, wherein 1/T is the sampling rate.

For each of the plurality of filter modules of the analysis filter bank, an output signal may be complex conjugated before it is received by the respective filter module.

For each of the plurality of filter modules of the analysis filter bank, for each even time index a negative sign may be applied to one of the two output signals before it is received by the respective filter module, e.g. by multiplying the signal with a factor $(-1)^{m+1}$, wherein m is the time index.

For each of the plurality of filter modules of the analysis filter bank, one of the two processed signals may be delayed in time before being received by the serial-to-parallel module, e.g. by T/2, wherein 1/T is the sampling rate.

Feature disclosed with reference to the different filter banks also apply to the methods for operating the filter banks and vice versa.

DESCRIPTION OF EMBODIMENTS

Figure 2:
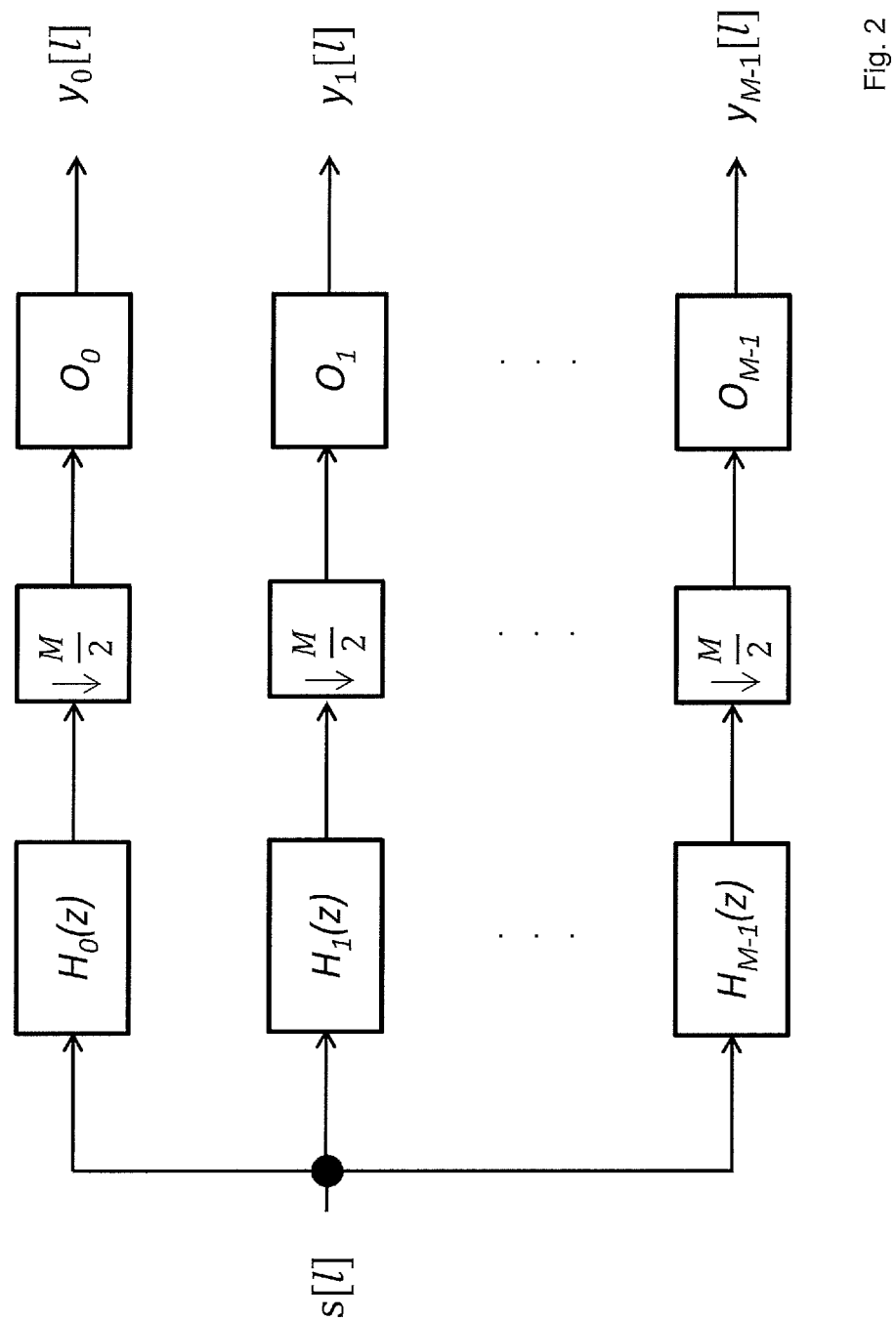
Figure 3:
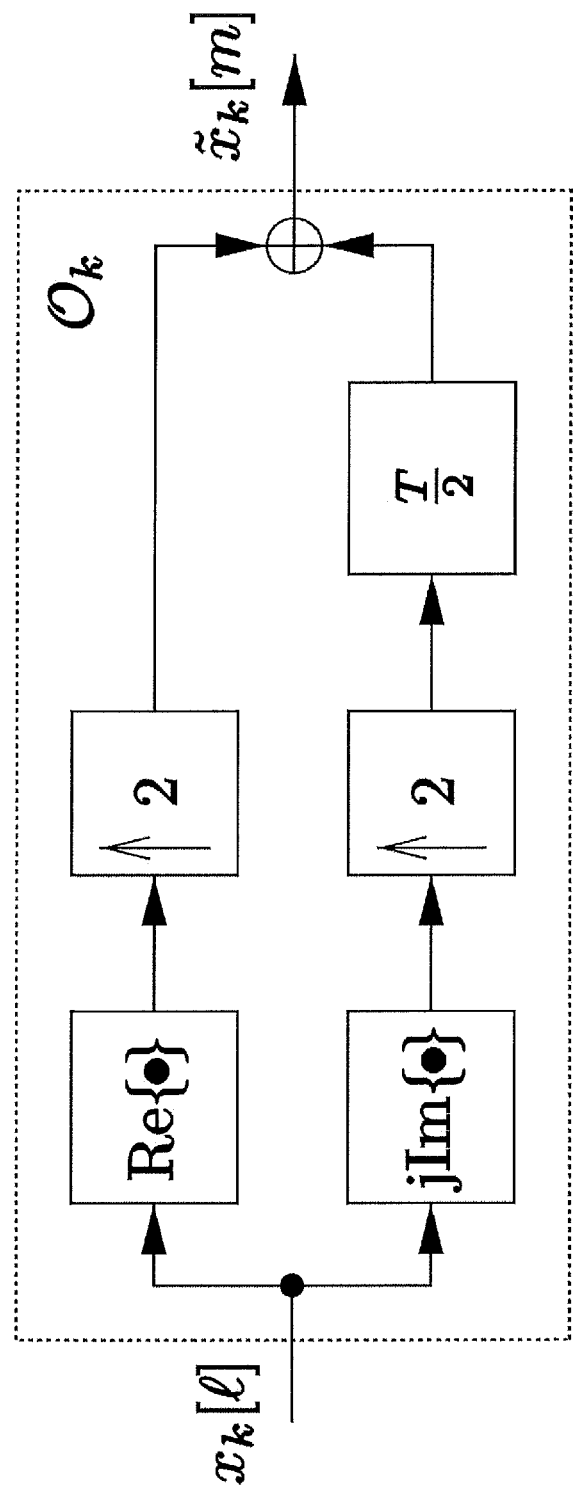
Figure 4:
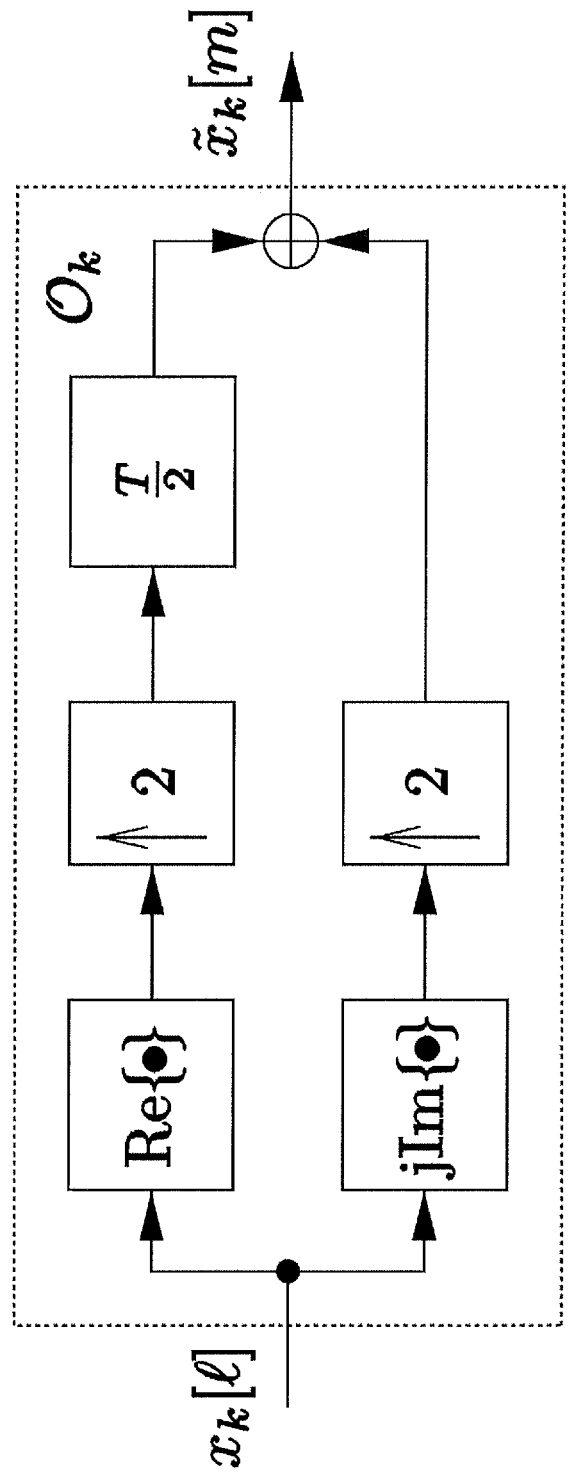
Figure 5:
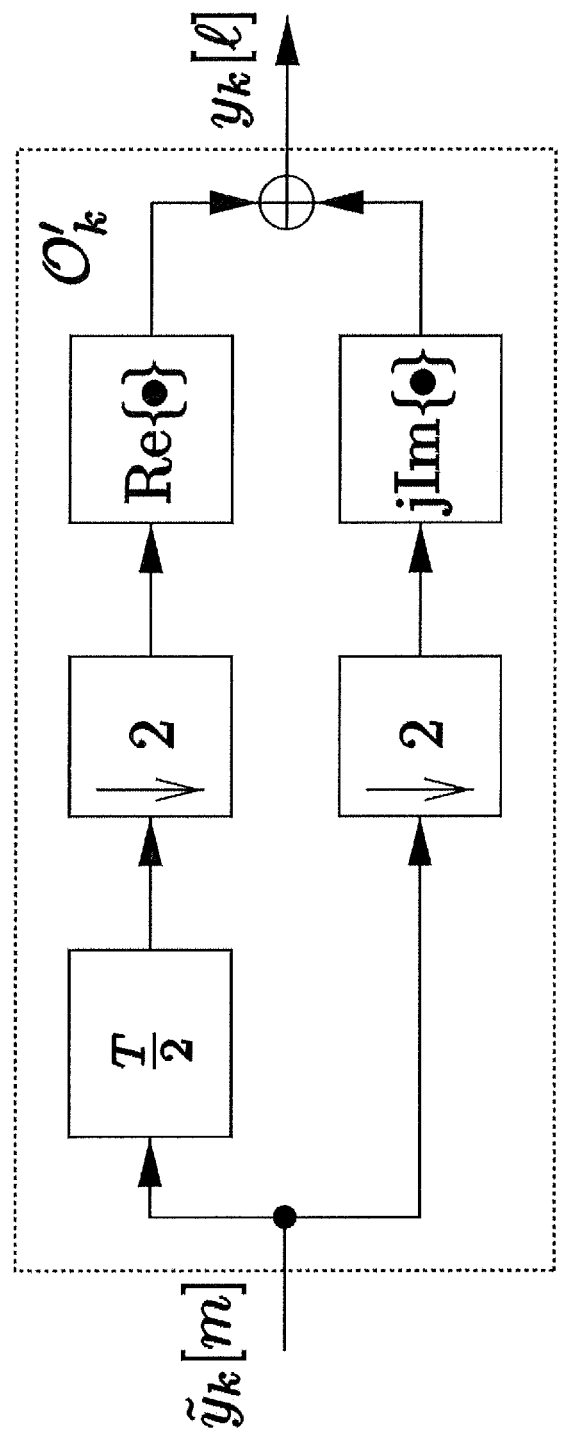
Figure 6:
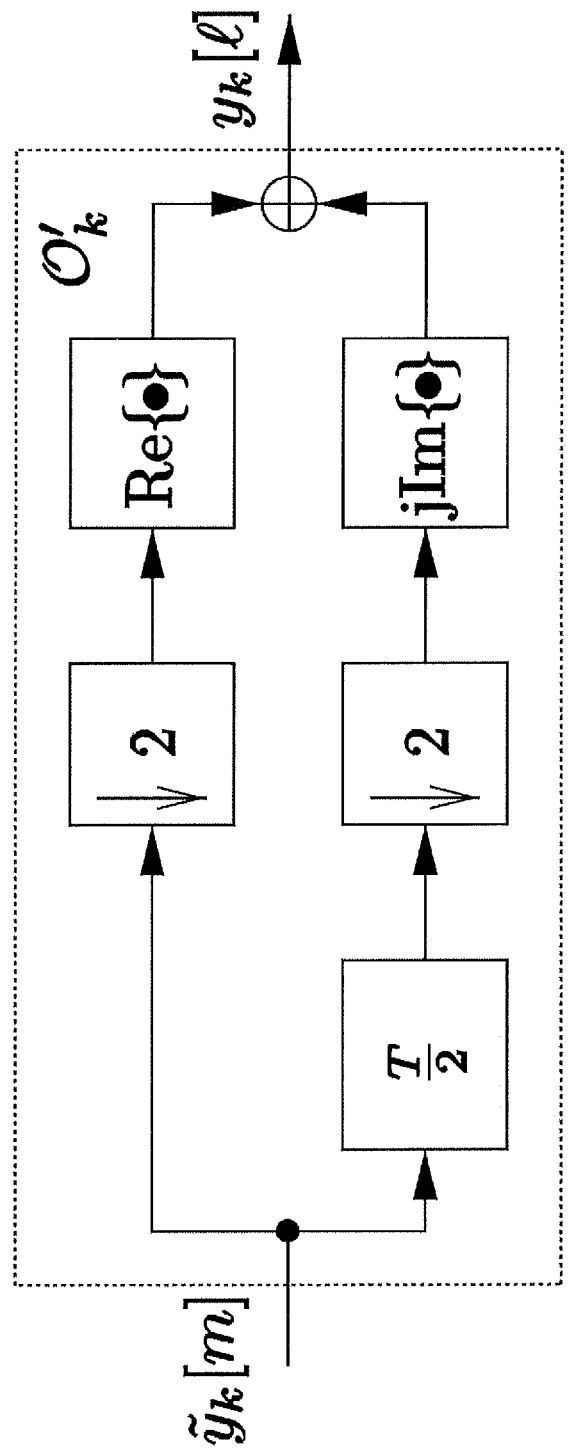
Figure 7:
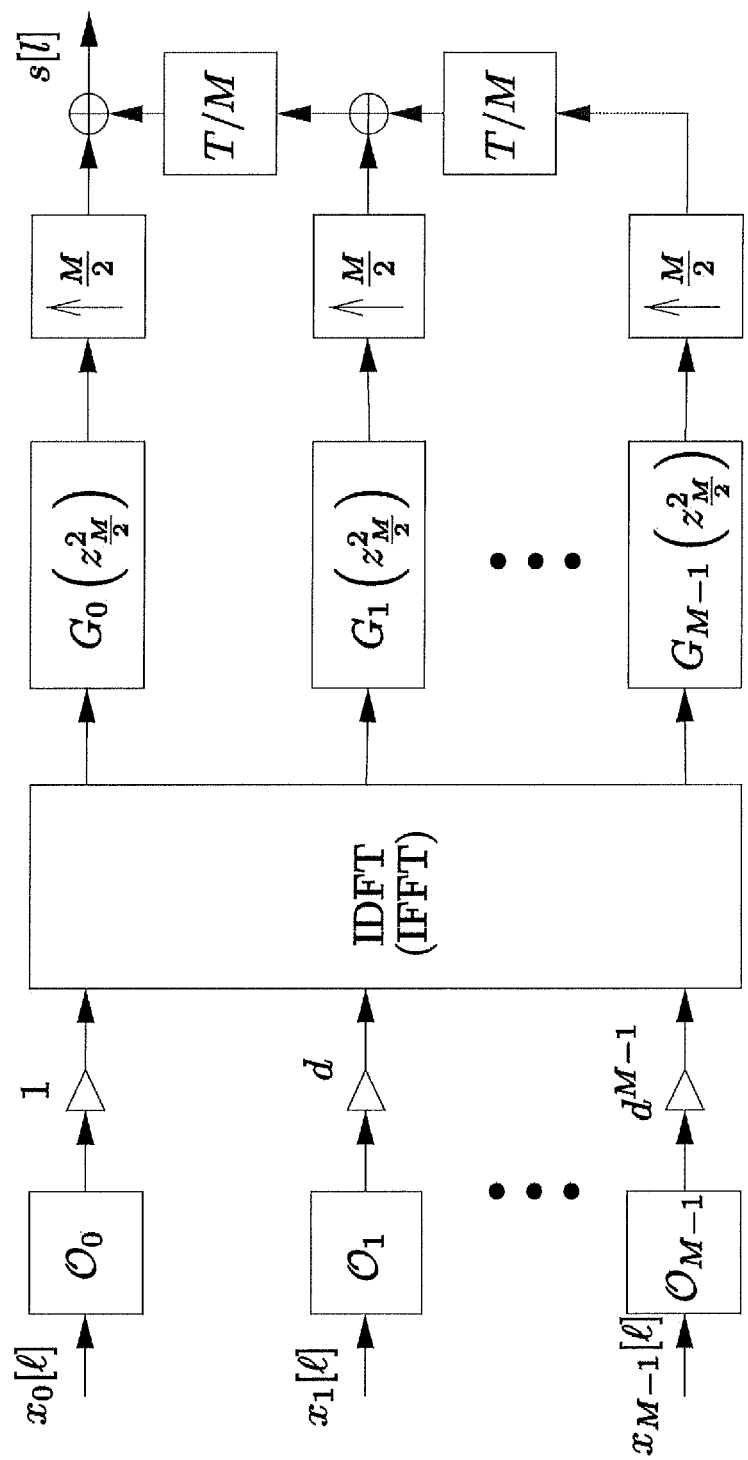
Figure 8:
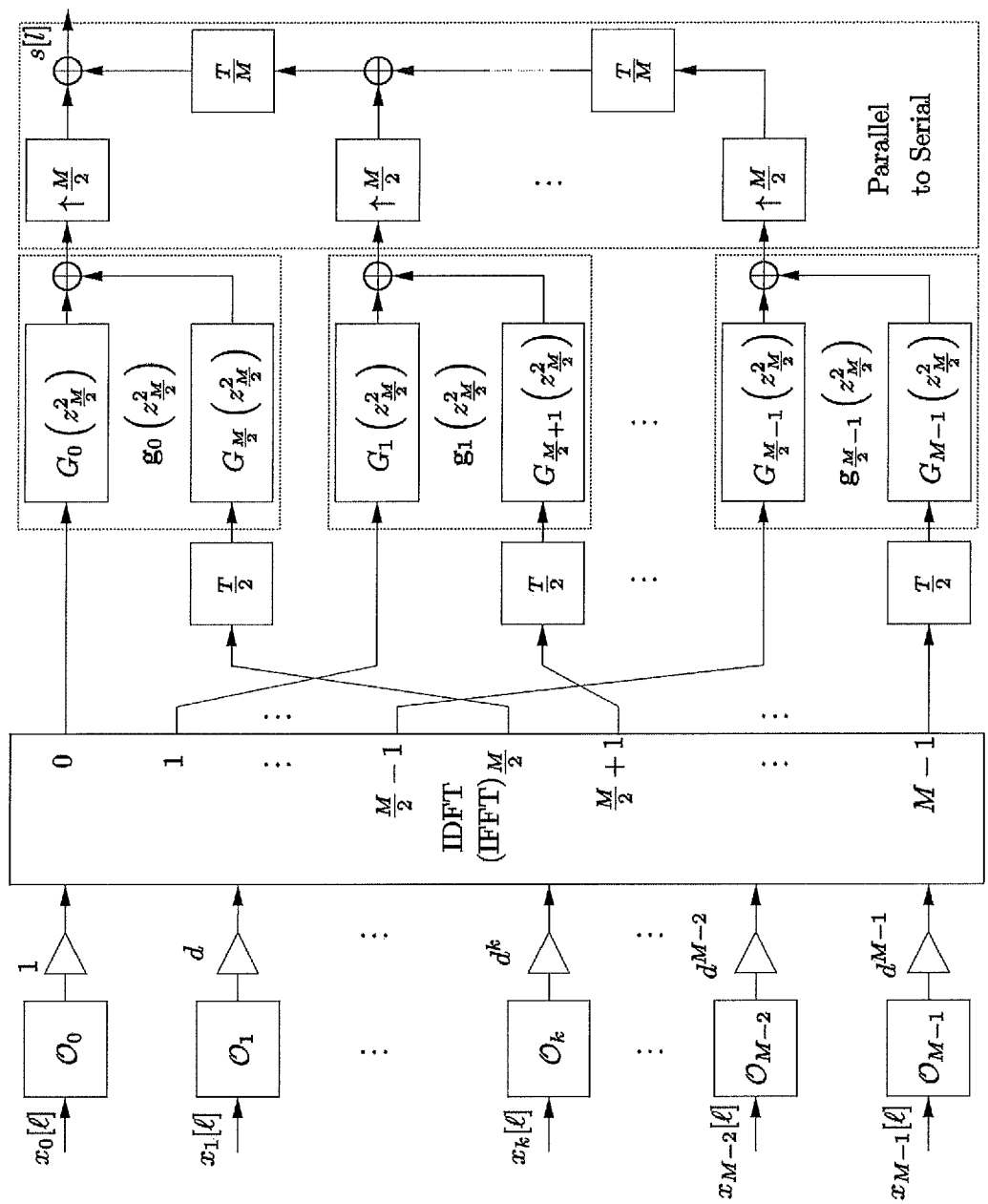
Figure 9:
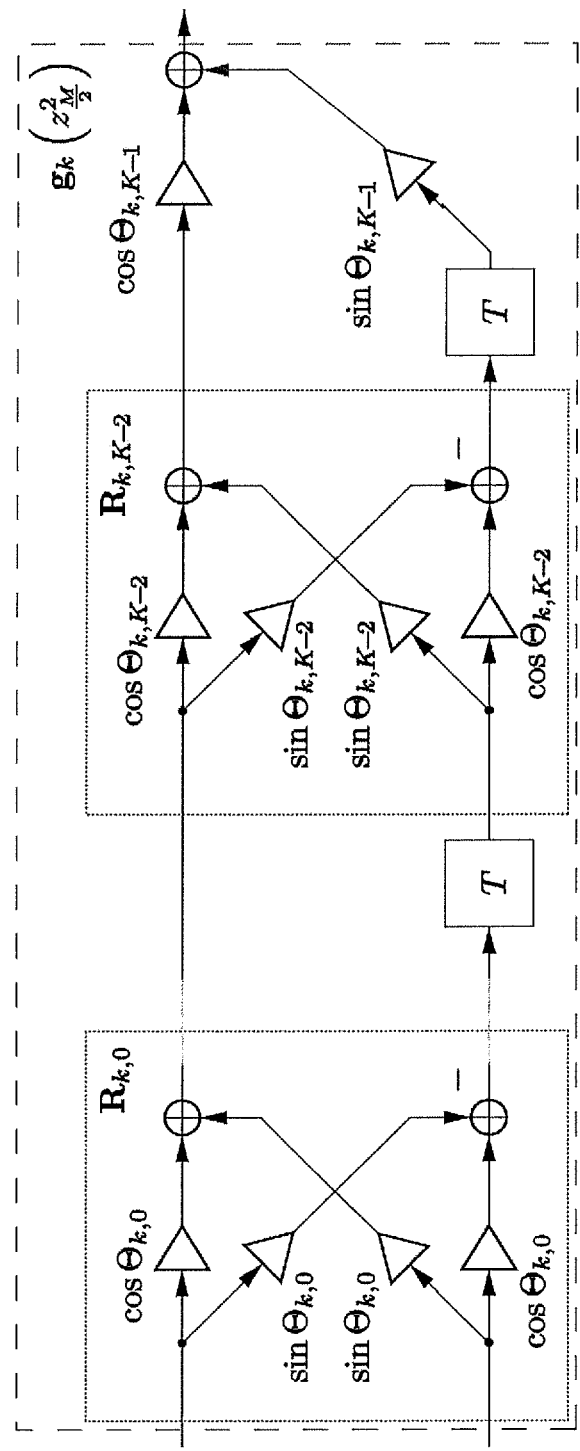
Figure 10:
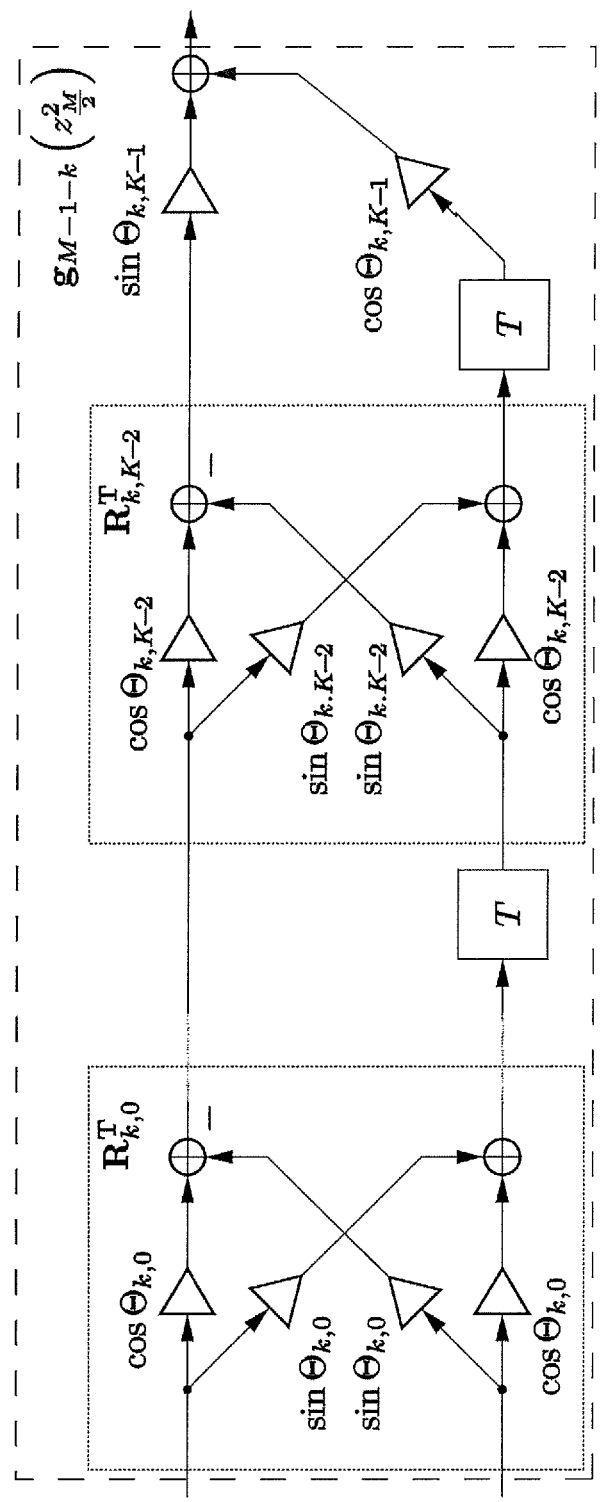
Figure 11:
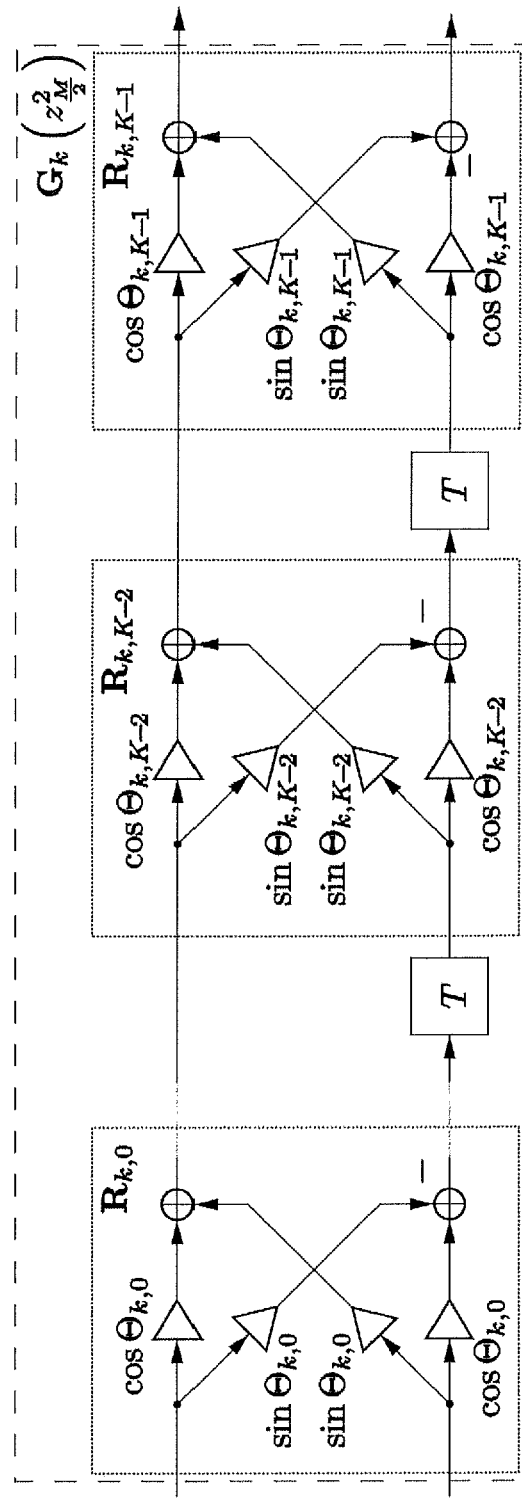
Figure 12:
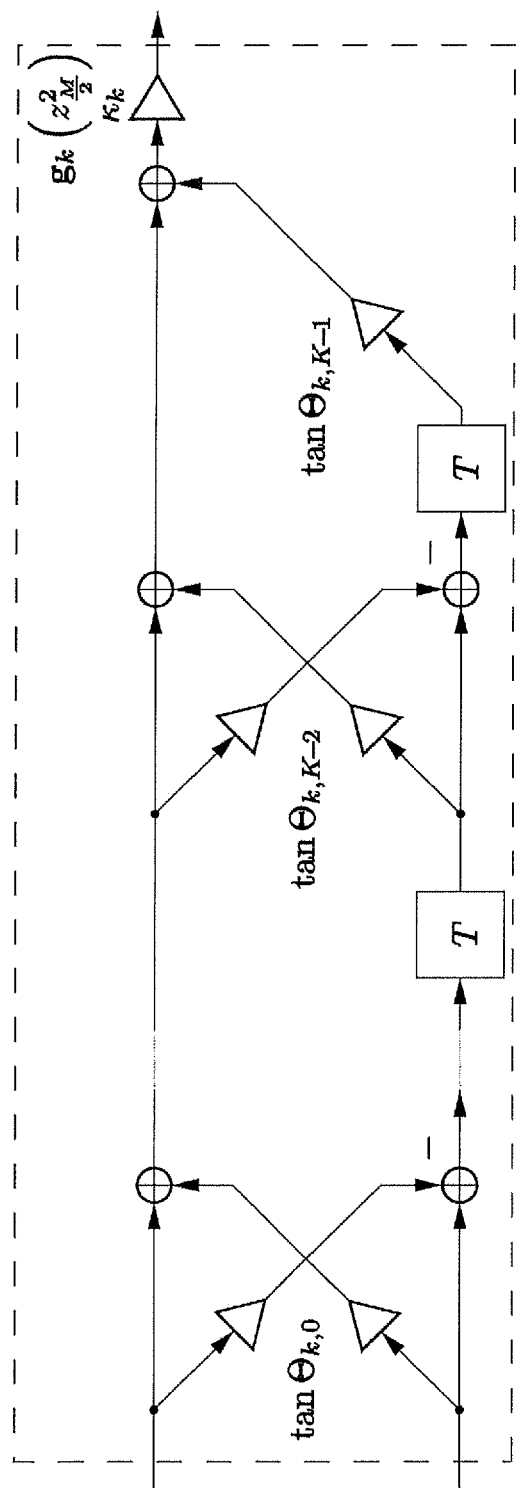
Figure 13:
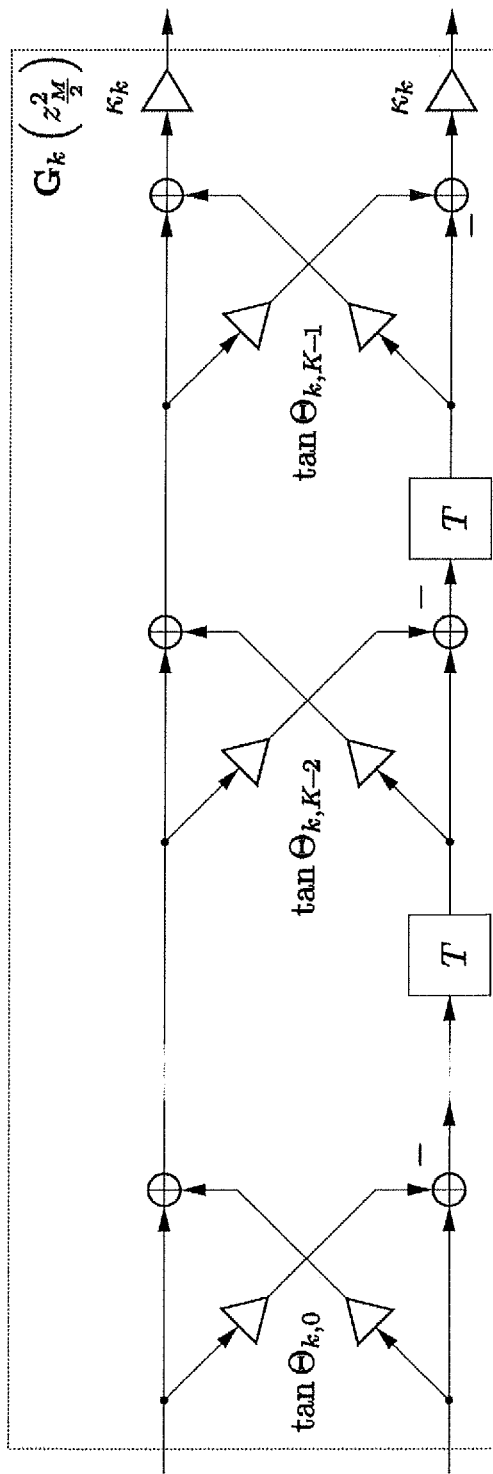
Figure 14:
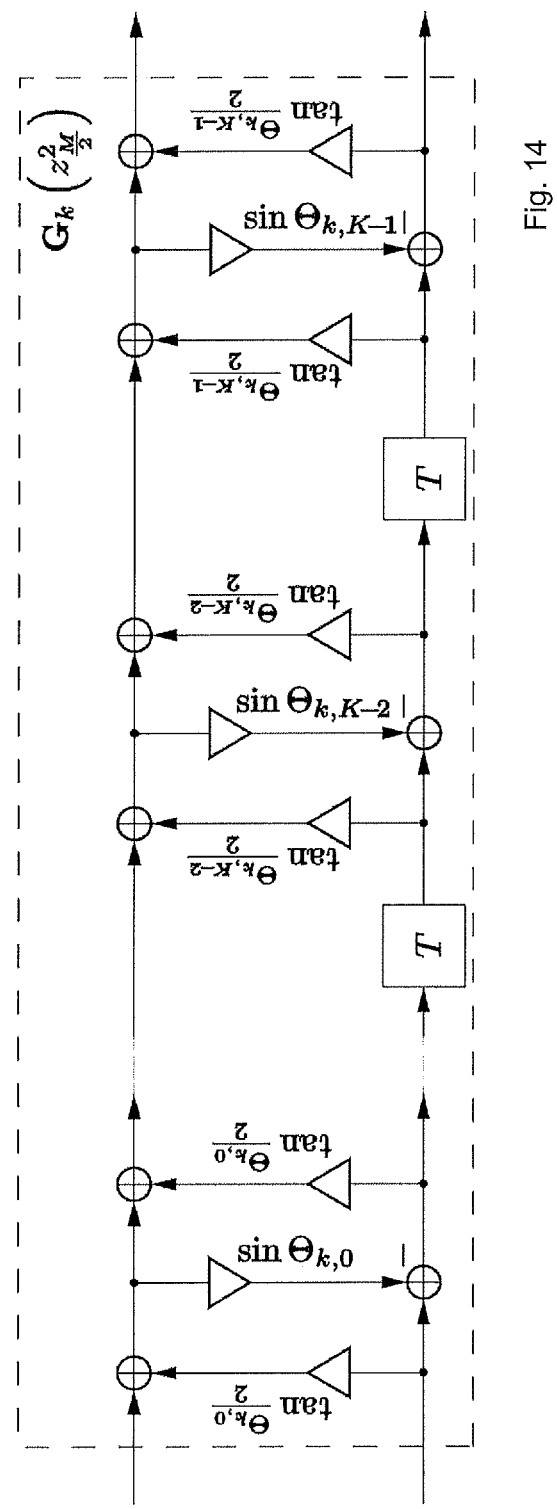
Figure 15:
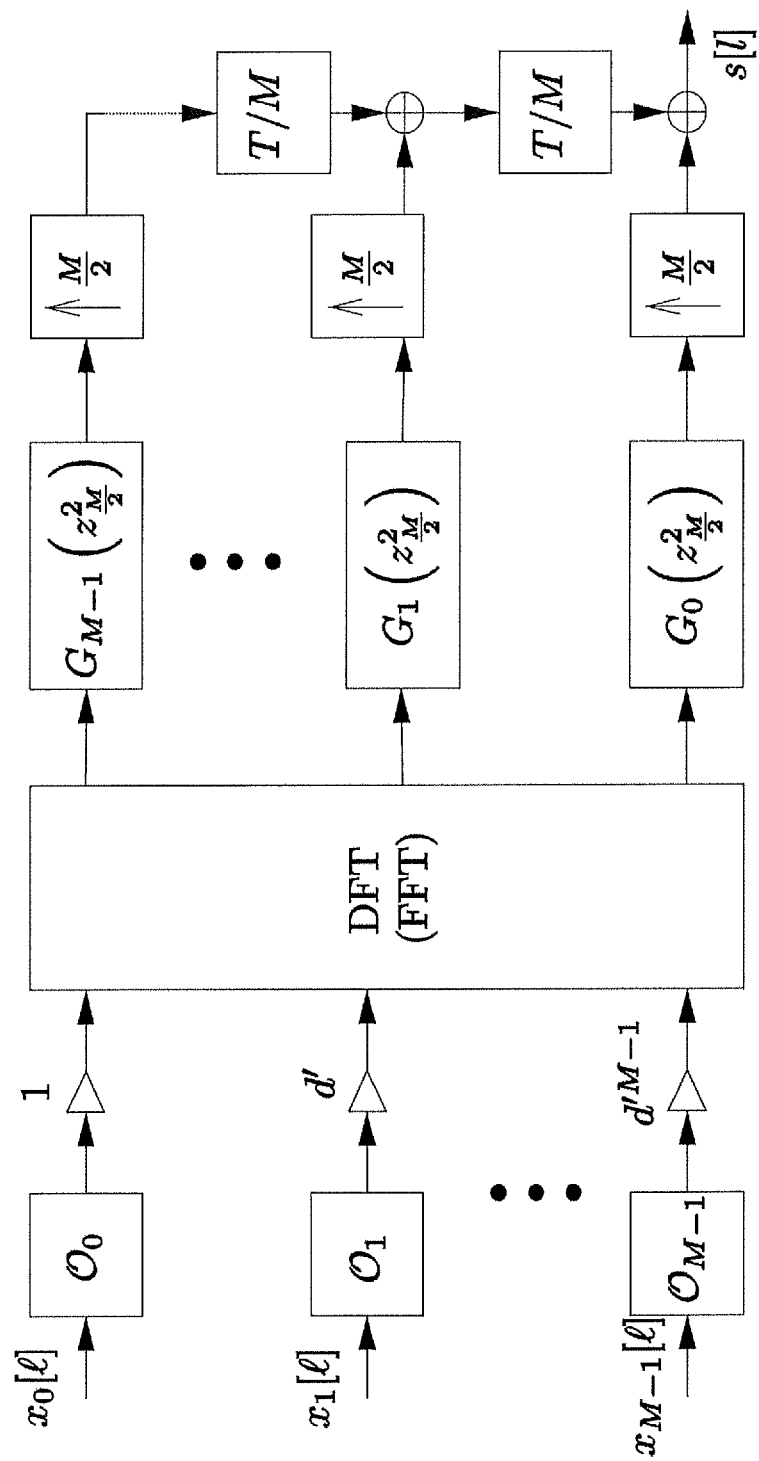
Figure 16:
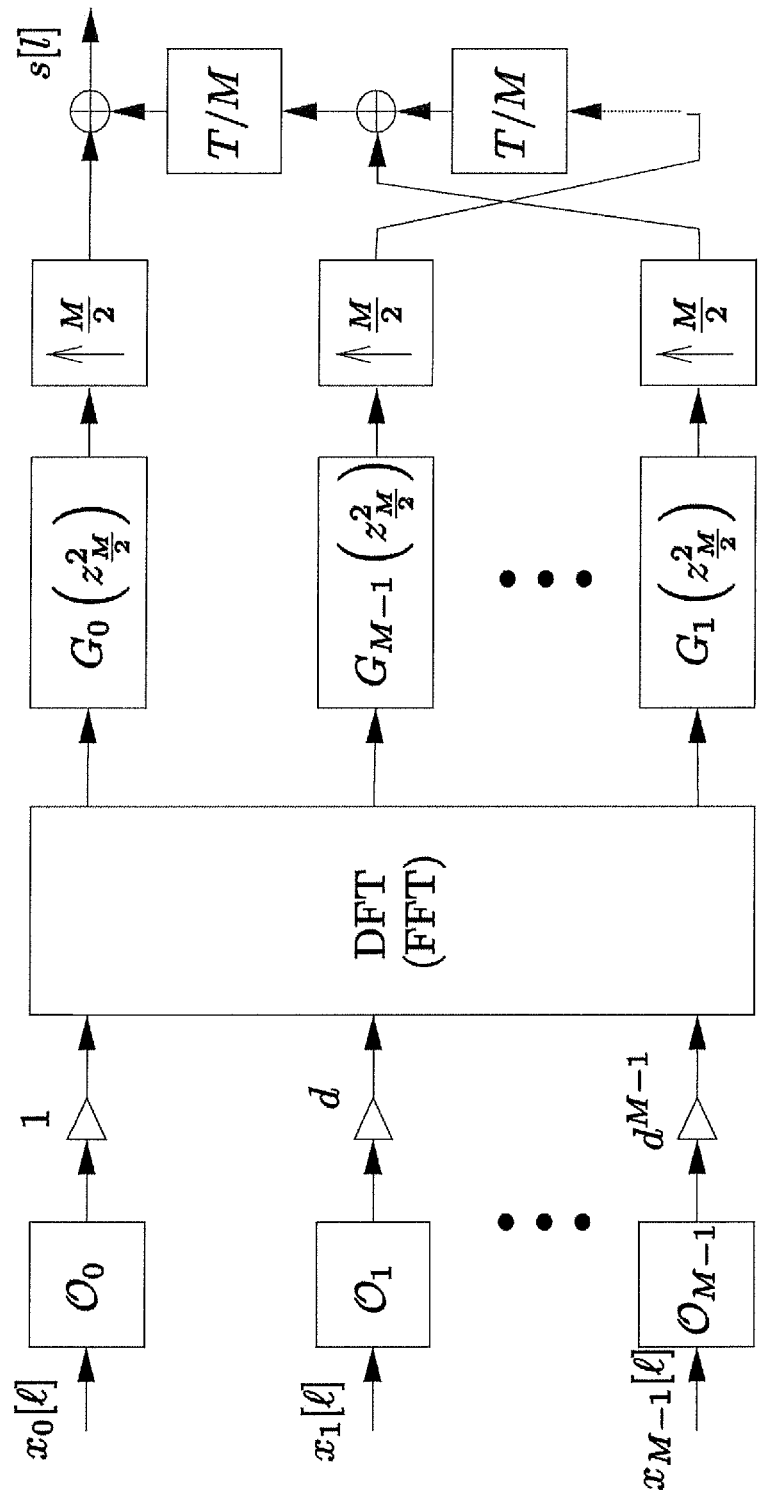
Figure 17:
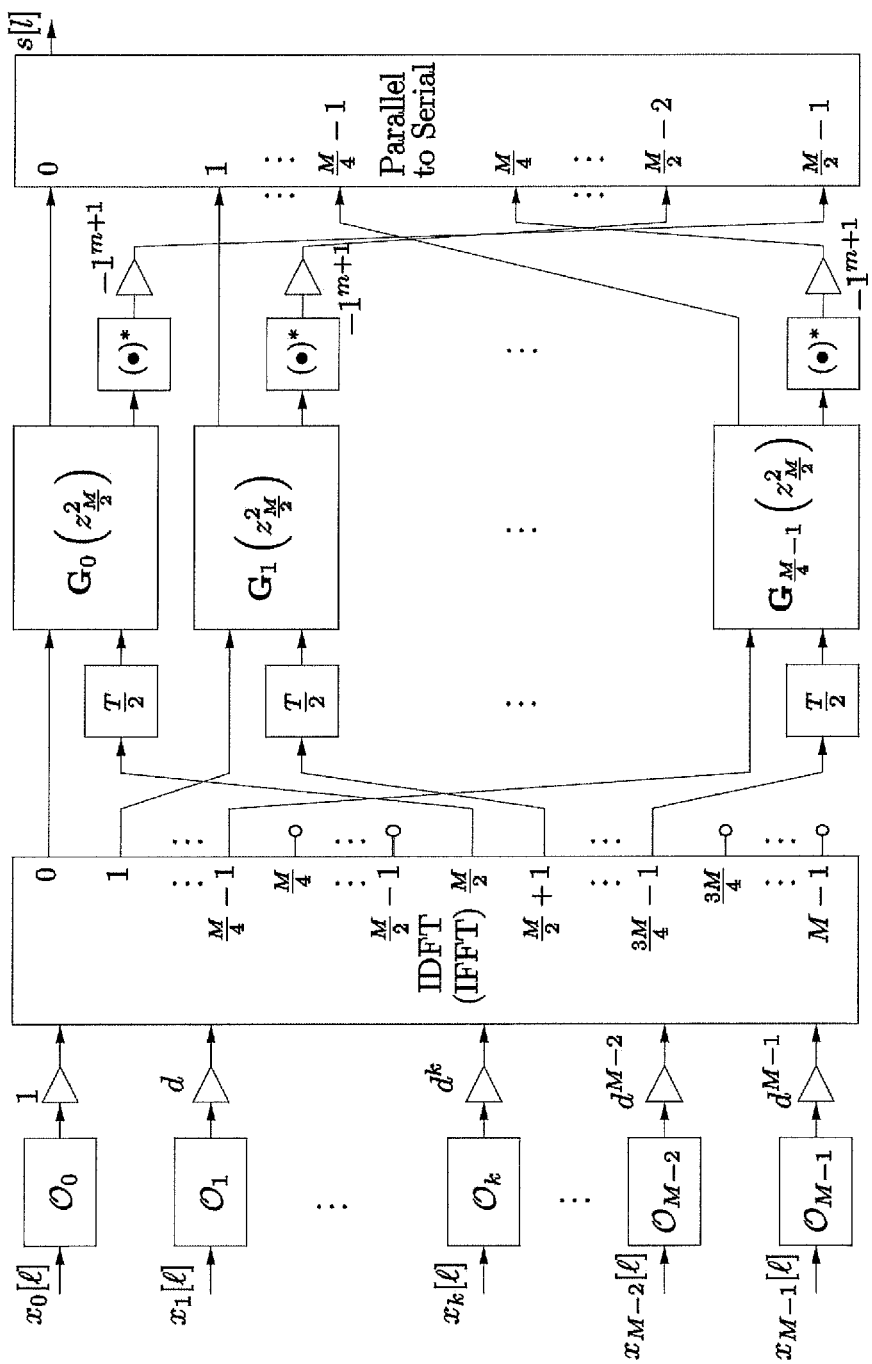
Figure 18:
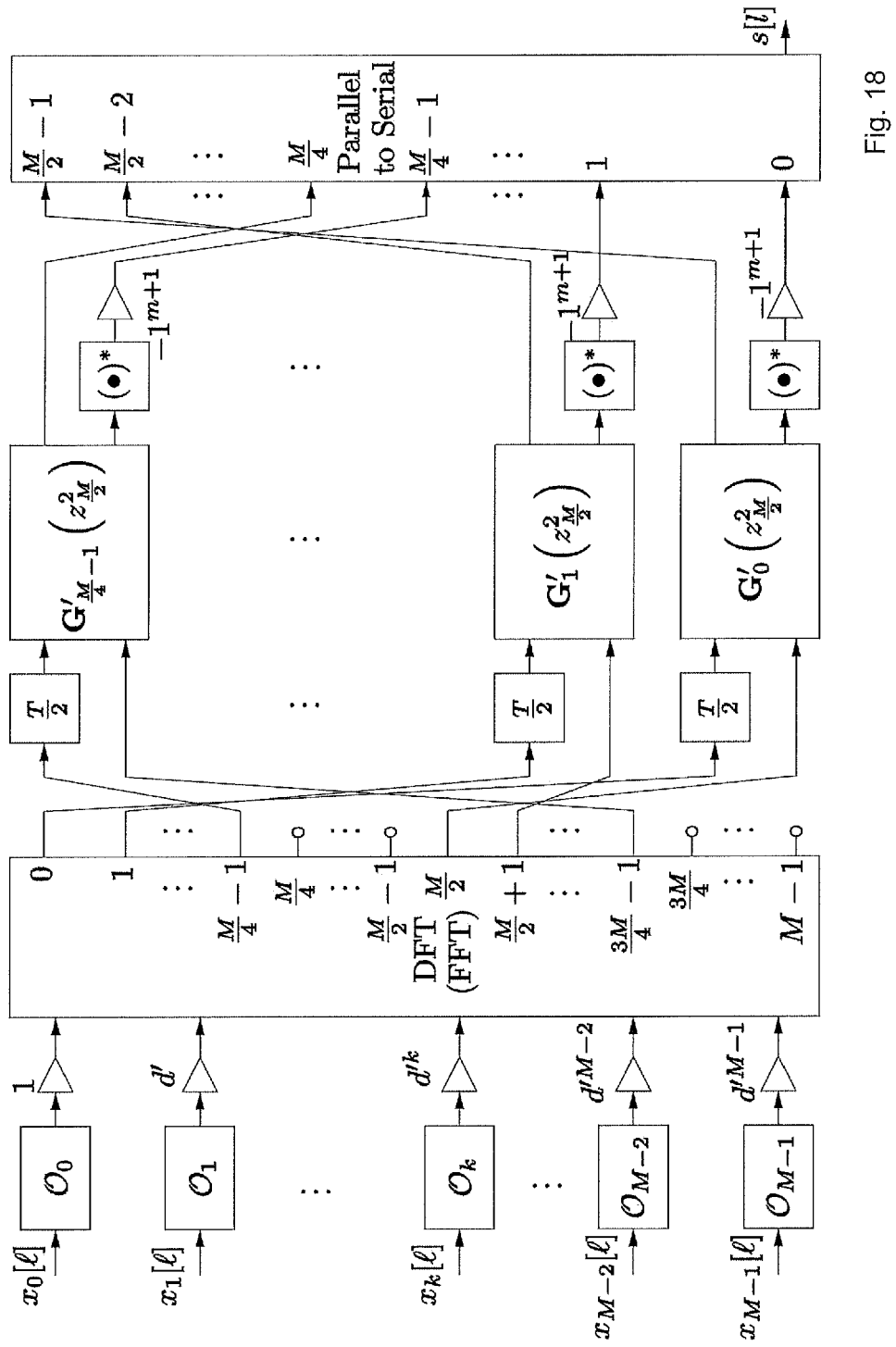
Figure 19:
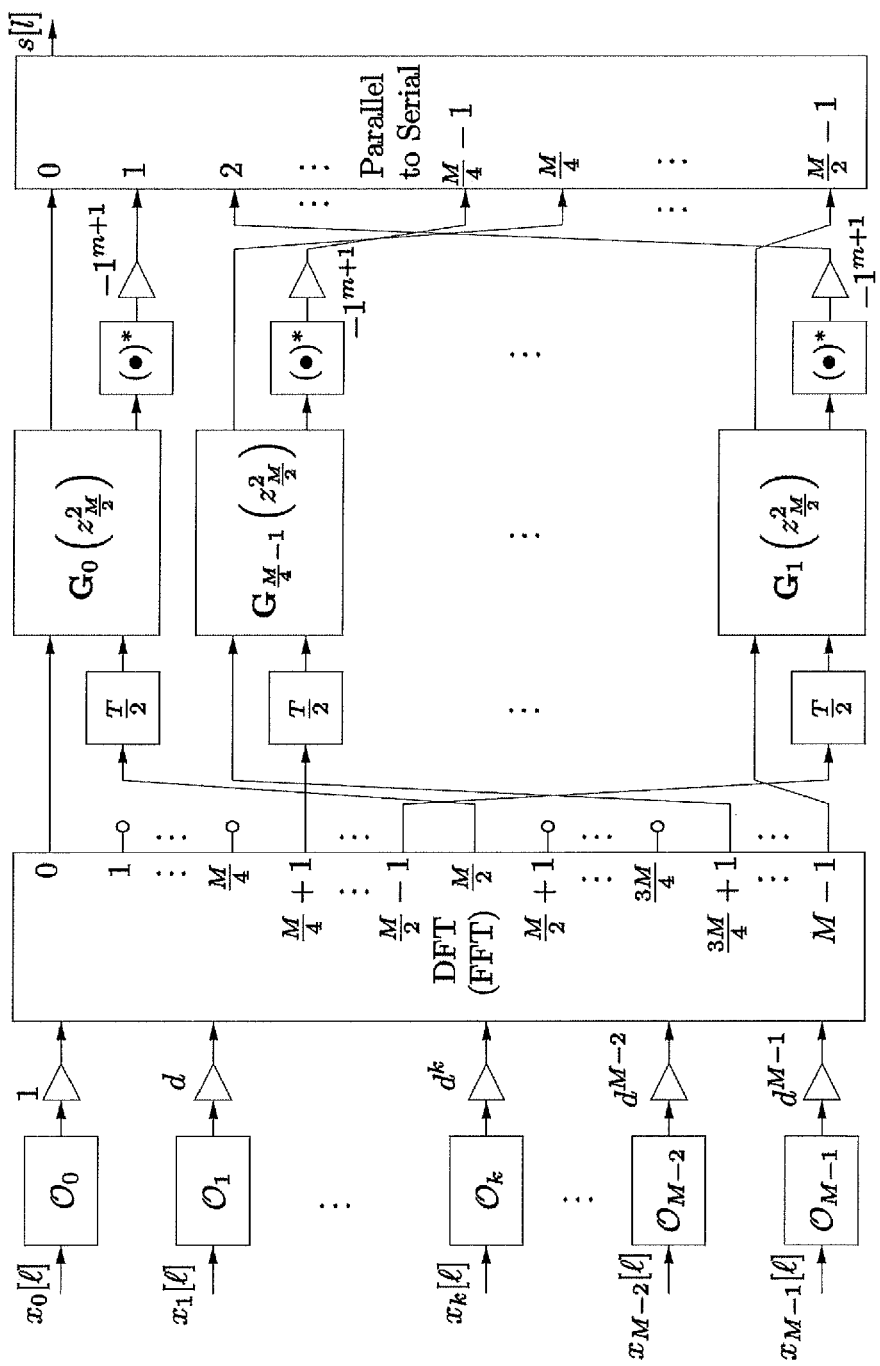
Figure 20:
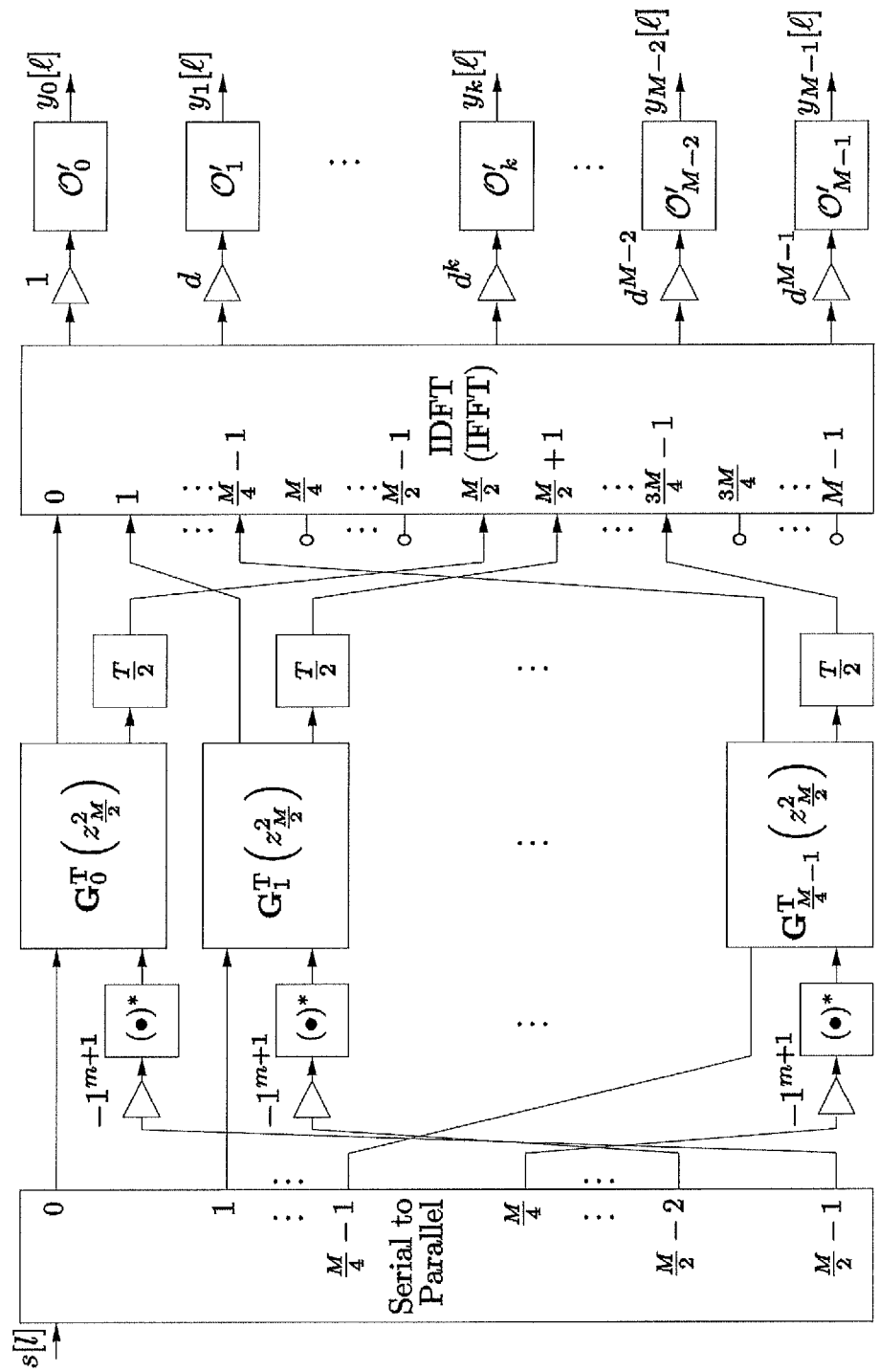
Figure 21:
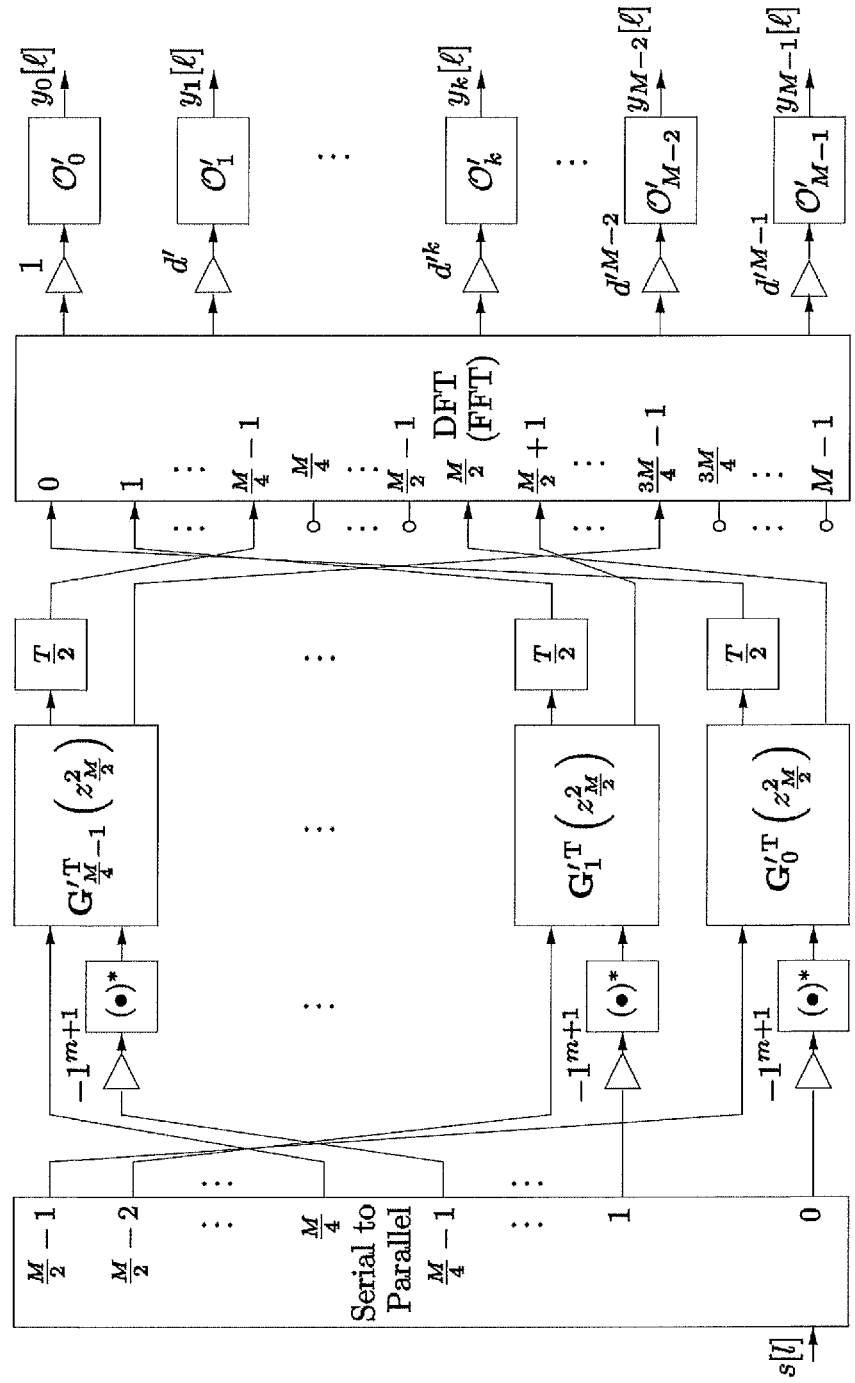
Figure 22:
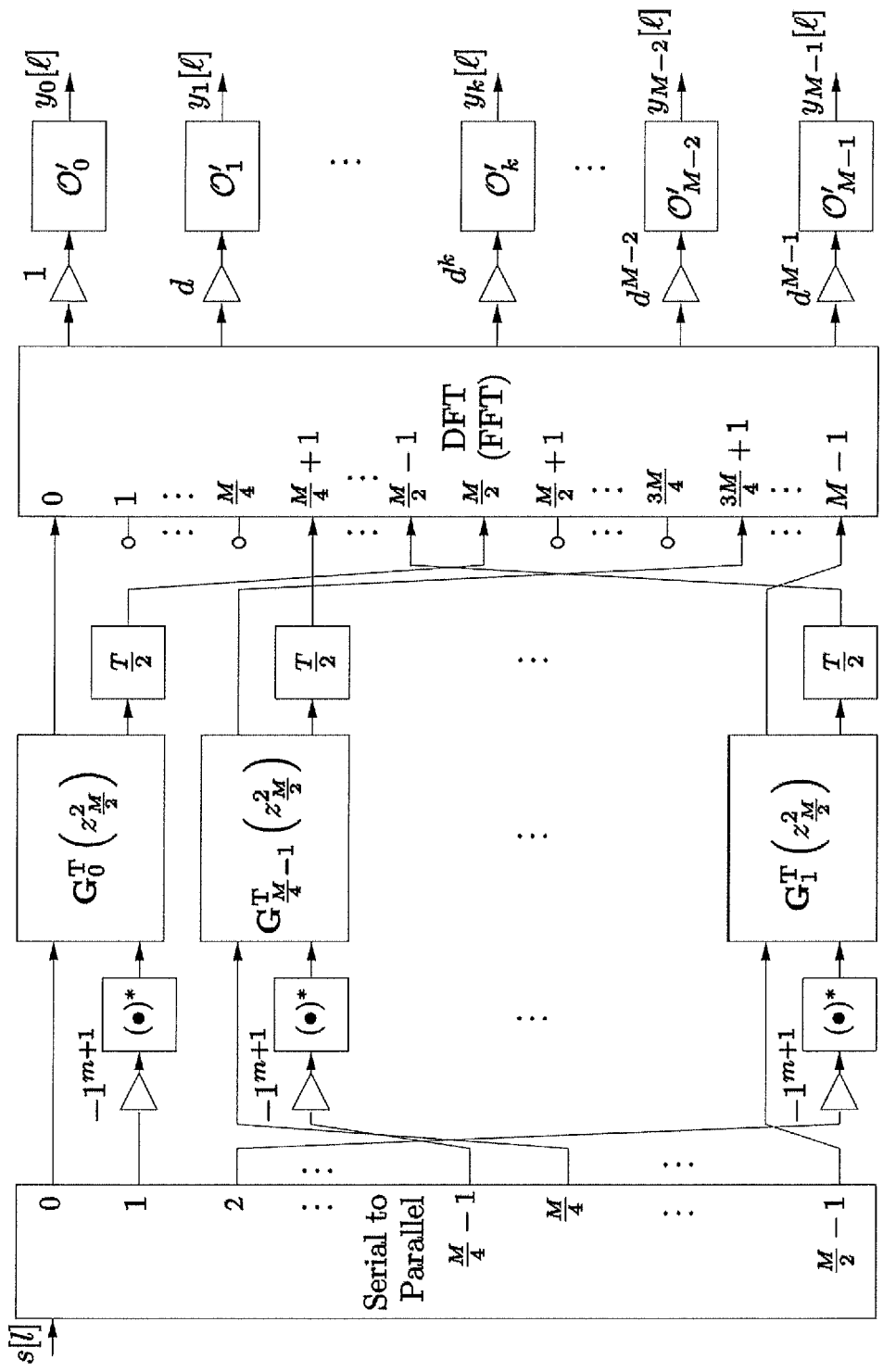
Figure 23:
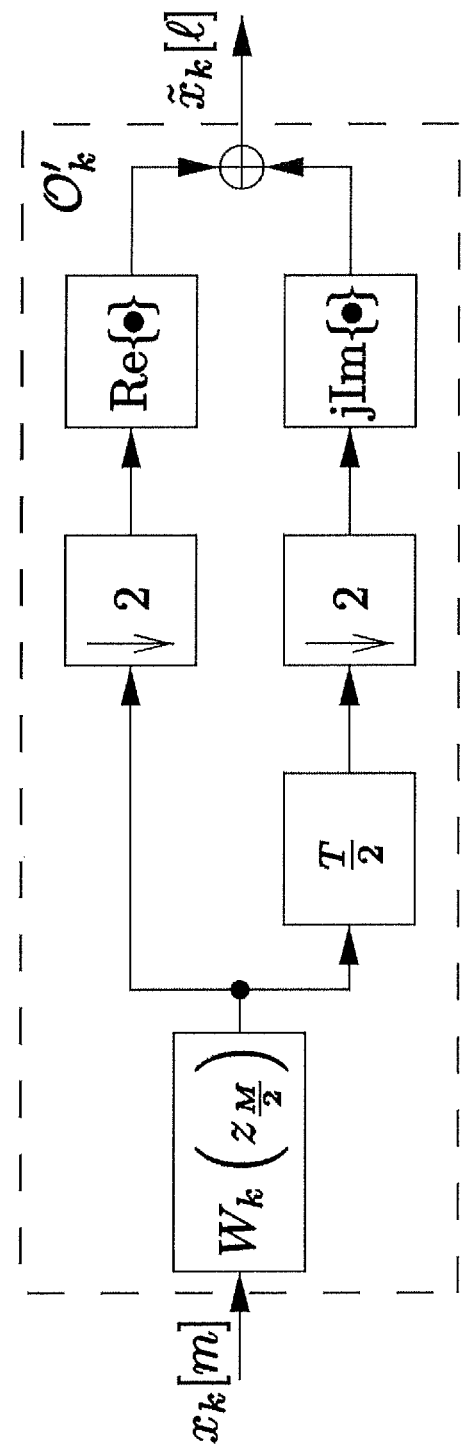
Figure 24:
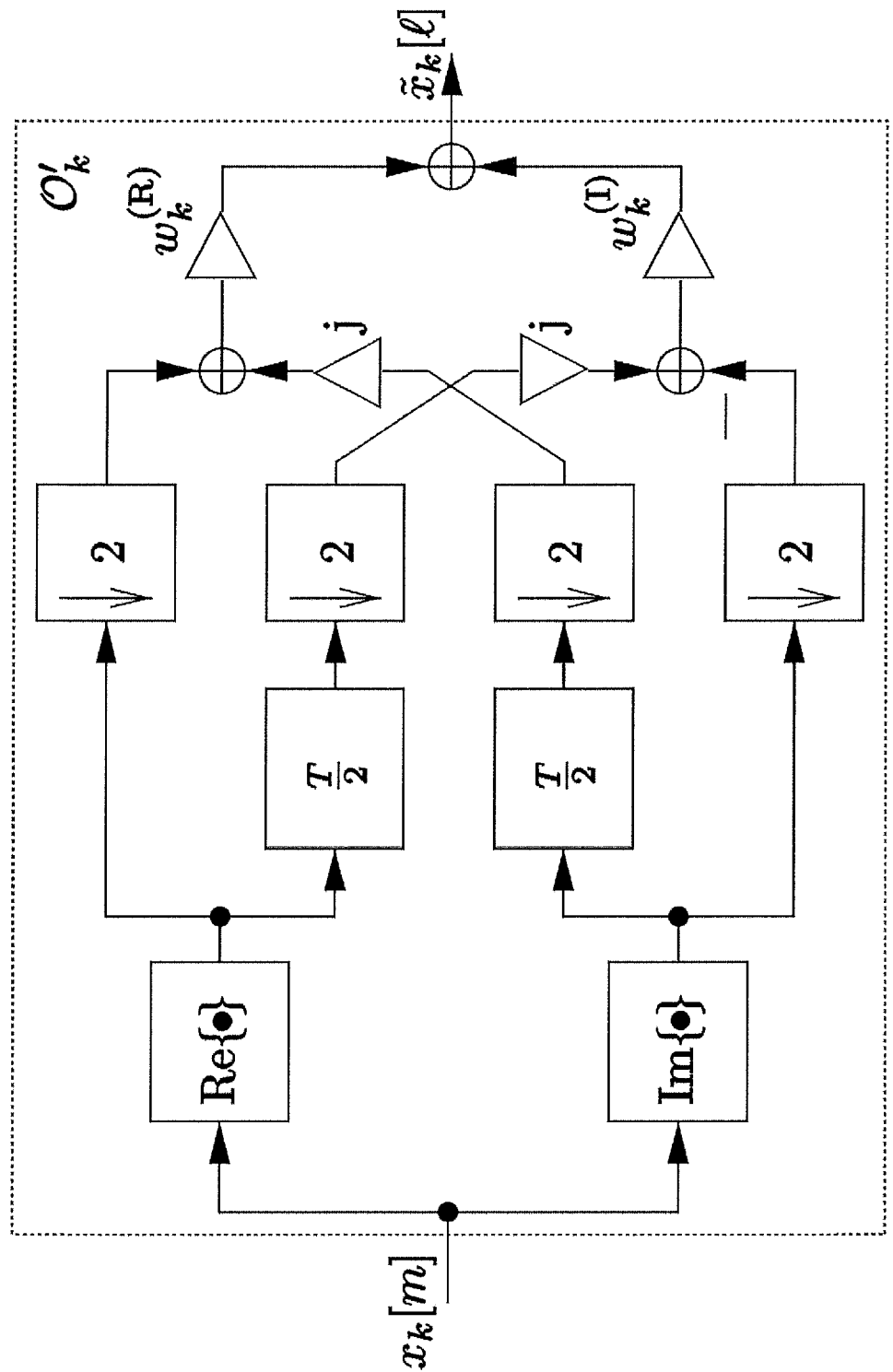
Figure 25:
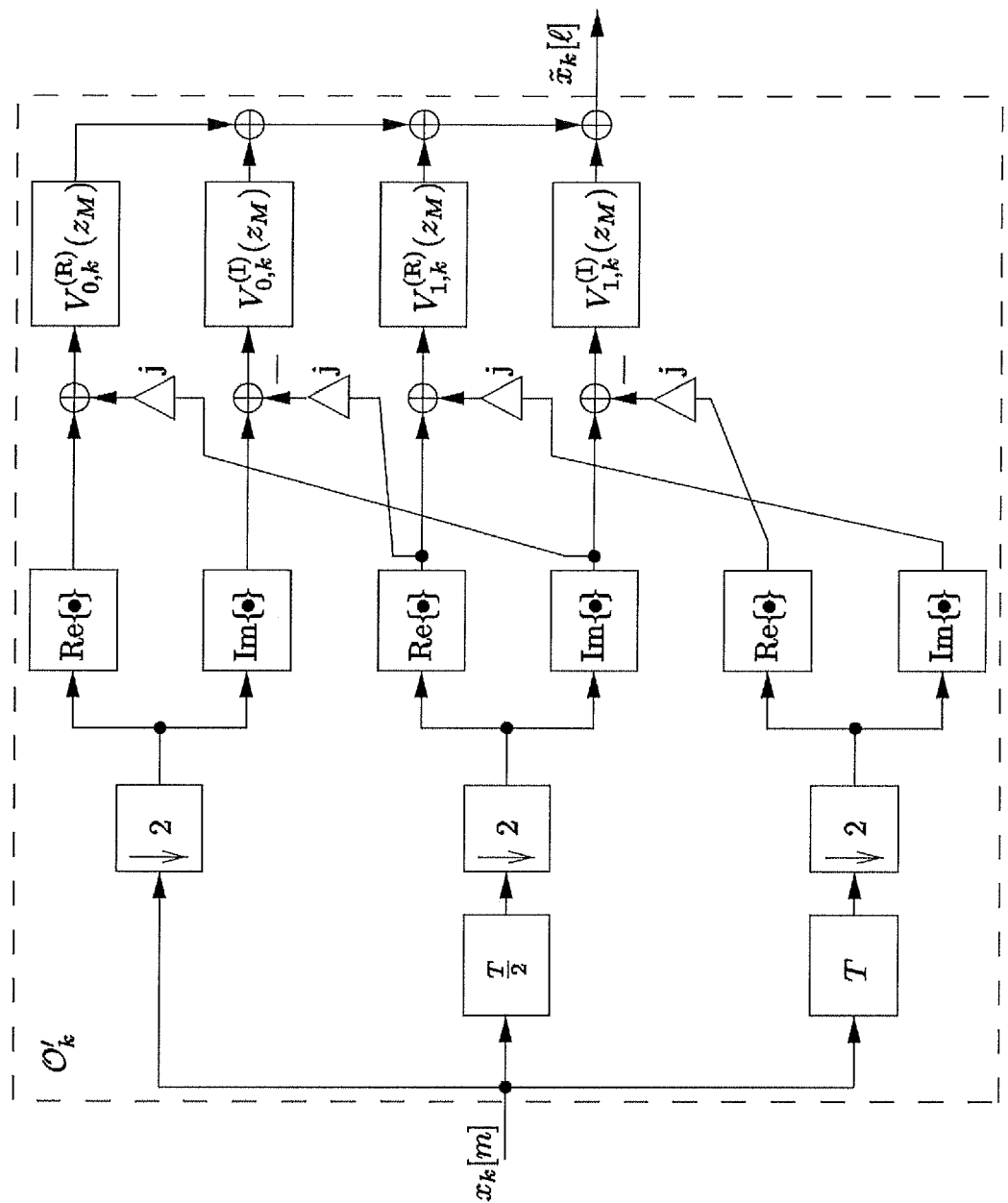

Following, exemplary embodiments are disclosed with reference to figures. Here show:

FIG. 1 a schematic representation of an exponentially modulated synthesis filter bank, FIG. 2 a schematic representation of an exponentially modulated analysis filter bank, FIG. 3 a schematic representation of real and imaginary parts staggering for even k, FIG. 4 a schematic representation of real and imaginary parts staggering for odd k, FIG. 5 a schematic representation of real and imaginary parts destaggering for even k, FIG. 6 a schematic representation of real and imaginary parts destaggering for odd k, FIG. 7 a schematic representation of a synthesis filter bank based on the polyphase decomposition of type 1, FIG. 8 a schematic representation of a synthesis filter bank based on the polyphase decomposition of type 1 reordered and grouped in power complementary pairs, FIG. 9 a schematic representation of a lattice realization of a polyphase pair, FIG. 10 a schematic representation of a lattice realization of another polyphase pair, FIG. 11 a schematic representation of a lattice realization of a 2×2 orthogonal transfer function, FIG. 12 a schematic representation of a 2×1 lattice structure with two-multiplier rotors, FIG. 13 a schematic representation of a 2×2 lattice structure with two-multiplier rotors, FIG. 14 a schematic representation of an orthogonal 2×2 polyphase components structure based on lifting steps, FIG. 15 a schematic representation of a synthesis filter bank based on the polyphase decomposition oft type 2, FIG. 16 a schematic representation of a synthesis filter bank based on the polyphase decomposition oft type 3, FIG. 17 a schematic representation of a synthesis filter bank based on the polyphase decomposition oft type 1 organized as orthogonal 2×2 transfer functions, FIG. 18 a schematic representation of a synthesis filter bank based on the polyphase decomposition oft type 2 organized as orthogonal 2×2 transfer functions, FIG. 19 a schematic representation of a synthesis filter bank based on the polyphase decomposition oft type 3 organized as orthogonal 2×2 transfer functions, FIG. 20 a schematic representation of an analysis filter bank based on the polyphase decomposition oft type 1 organized as orthogonal 2×2 transfer functions, FIG. 21 a schematic representation of an analysis filter bank based on the polyphase decomposition oft type 2 organized as orthogonal 2×2 transfer functions, FIG. 22 a schematic representation of an analysis filter bank based on the polyphase decomposition oft type 3 organized as orthogonal 2×2 transfer functions, FIG. 23 a schematic representation of a multi-tap equalizer followed by a destaggering for odd k, FIG. 24 a schematic representation of a single-tap equalizer jointly realized with destaggering for odd k, FIG. 25 a schematic representation of a multi-tap equalizer jointly realized with destaggering for odd k, Following, we consider uniform exponentially MFBs. In uniform FBs, all subchannels or sub-band signals have the same sampling rate 1/T. The filters $F_k(z)$ in the SFB, as depicted in FIG. 1, and $H_k(z)$ in the AFB, as shown in FIG. 2, have the same bandwidth and are derived from a single prototype filter denoted as $H_P(z)$, where the complex frequency variable z for discrete-time systems is related to the continuous-time frequency variable s by the relation $$z = e^{s\frac{T}{M}},$$

where $s = \sigma + j\omega$ and $\omega = 2\pi f$ is the angular frequency and f the technical frequency. In MFBs, both $H_k(z)$ and $F_k(z)$ are obtained by exponentially modulating $H_P(z)$:

$$H_k(z) = F_k(z) = H_P(zW_M^k)d^k, k = 0, 1, \ldots, M-1$$

where $$H_P(z) = H_0(z) = \sum_{l=0}^{P-1} h[l]z^{-l},$$

$$H_k(z) = F_k(z) = \sum_{l=0}^{P-1} h_k[l]z^{-l} = \sum_{l=0}^{P-1} h_P[l]W_M^{-k(l-\frac{P-1}{2})}z^{-l},$$

where $$h_k[l] = h_P[l]W_M^{-k(l-\frac{P-1}{2})}.$$

with $$W_M = e^{-j\frac{2\pi}{M}} \text{ and } d = e^{-j\frac{2\pi}{M}\frac{P-1}{2}} = W_M^{\frac{P-1}{2}}.$$

We also assume here, without loss of generality, that the length of the prototype is P=KM, where K is the time overlapping factor and determines not only the complexity of the filter bank, but also its memory. The block ↑

$$\frac{M}{2}$$

performs an upsampling by a factor $$\frac{M}{2},$$

that means $$\frac{M}{2} - 1$$

samples with value zero are inserted between each original sample at a rate $$\frac{M}{2}$$

higher than the input rate.

The block $O_k$ in the SFB performs a $$\frac{T}{2}$$

staggering or of the real and imaginary parts of the low-rate signals $x_k[\ell]$ and is frequently called OQAM-staggering, -modulation or -mapping. FIG. 3 depicts the internal structure of $O_k$ for sub-channels with even k and FIG. 4 for odd k, where the Re{•} and jIm{•} blocks are simply exchanged.

The filtered signals at the AFB are downsampled by the block ↓

$$\frac{M}{2}$$

that removes $$\frac{M}{2} - 1$$

samples and lowers the rate by a factor $$\frac{M}{2}.$$

The block $O_k'$ represents the OQAM or real and imaginary de-staggering. FIG. 5 shows the OQAM-de-staggering operation for sub-channels with even k and FIG. 6 for odd k.

Another structure for the SFB is shown in FIG. 7, where $$G_k\left(z_{\frac{M}{2}}^2\right),$$

k=0, . . . , M−1 is the k-th type-1 polyphase component of $H_P(z)$ upsampled by a factor of 2 and given by the relation $$H_P(z) = \sum_{m=0}^{K-1}\sum_{k=0}^{M-1} h_P[mM+k]z^{-(mM+k)} = \sum_{k=0}^{M-1} G_k(z^M)z^{-k},$$

with $G_k(z_M) = \sum_{m=0}^{K-1} h_P[mM+k]z_M^{-m}$ and since we have assumed that the prototype has P=KM coefficients, each polyphase component has K non-zero coefficients.

The subfilters are given by $$H_k(z) = F_k(z) = \sum_{n=0}^{M-1} G_n(z^M W_M^{Mk}) z^{-n} W_M^{-kn} d^k = \sum_{n=0}^{M-1} G_n(z^M) z^{-n} W_M^{-kn} d^k.$$

We define the vectors $$h(z) = [H_0(z) H_1(z) \ldots H_{M-1}(z)]^T,$$

$$f(z) = [F_0(z) F_1(z) \ldots F_{M-1}(z)]^T,$$

$$a(z) = [1 z^{-1} \ldots z^{-(M-1)}]^T,$$

$$x(z) = [\tilde{X}_1(z^M) \tilde{X}_2(z^M) \ldots \tilde{X}_{M-1}(z^M)]^T,$$

$$y(z) = [\tilde{Y}_1(z^M) \tilde{Y}_2(z^M) \ldots \tilde{Y}_{M-1}(z^M)]^T,$$

and get the following input output relations for the AFB and SFB $$x(z) = h(z) S(z),$$

$$S(z) = f^T(z) y(z),$$

where $$h(z) = D W_M^H G(z^M) a(z),$$

$$f^T(z) = a^T(z) G(z^M) W_M D$$

with $D = \text{diag}(1, d, \ldots, d^{M-1})$, $G(z^M) = \text{diag}(G_0(z^M), G_1(z^M), \ldots, G_{M-1}(z^M))$, $W_M$ and $W_M^H$ are the M size unitary DFT and IDFT matrix. The DFT or IDFT and can be efficiently implemented using Fast Fourier Transform (FFT) algorithms. The equations can be further developed with the application of the Nobble identities and combined with the OQAM staggering to come up with the structure in FIG. 7. We assume here that the prototype filter $H_P(z)$ is designed such that perfect reconstruction (PR) conditions are fulfilled. Furthermore, we assume that the prototype FIR filter has linear phase and, consequently, symmetrical impulse response. The constraints for PR are given by $$G_k\left(z_{\frac{M}{2}}^2\right) G_{M-1-k}\left(z_{\frac{M}{2}}^2\right) + G_{k+\frac{M}{2}}\left(z_{\frac{M}{2}}^2\right) G_{\frac{M}{2}-1-k}\left(z_{\frac{M}{2}}^2\right) = \frac{2}{M} z_{\frac{M}{2}}^{-2(K-1)},$$

where now $k = 0, \ldots,$ $$\frac{M}{4} - 1.$$

It is worth noting that because of the symmetry of the prototype impulse response the following holds $$G_{M-1-k}\left(z_{\frac{M}{2}}^2\right) = z_{\frac{M}{2}}^{-2(K-1)} \tilde{G}_k\left(z_{\frac{M}{2}}^2\right),$$

where the right hand side is called the causal para-conjugate of the transfer function $$G_k\left(z_{\frac{M}{2}}^2\right).$$

For the case that the prototype filter has a lengths of P=M or P=2M (K=1 and K=2), there exists closed form expressions of the filter's coefficients $h_P[l]$, $l = 0, \ldots, P-1$ the so called Extended Lapped Transform (ELT). Those closed form expressions are obtained from the assumption that the polyphase components can be realized with a lattice structure as will be explained later. For K=1 the ELT prototype is given by $$h_P[l] = \pm \sin\left(\frac{\pi}{M}\left(l + \frac{1}{2}\right)\right), l = 0, \ldots, M - 1$$

and for K=2 is given by $$h_P[l] = \mp \frac{\sqrt{2}}{4} \pm \cos\left(\frac{\pi}{M}\left(l + \frac{1}{2}\right)\right), l = 0, \ldots 2M - 1.$$

For the cases where K>2 there is no closed form solution to directly obtain the prototype coefficients. One possibility is to obtain the prototype by numerical optimization methods. Given a certain design criteria for the optimization of $H_P(z)$, e.g. minimization of the stopband energy, the $$\frac{M}{4}$$

equations can be employed in a constrained optimization method. It is worth noting that the constraints are non-linear relations on the prototype filter coefficients. The typical objective function will usually also be a non-linear function of the prototype coefficients. It is worth noting that although the prototype has a symmetrical impulse response, necessary to achieve PR, one multiplier per prototype filter coefficient has to be realized in the polyphase network.

Regarding FIG. 7, it can be concluded that M/2 pairs of polyphase components are power complementary. The components $G_k(z^2)$ and $$G_{k+\frac{M}{2}}\left(z_{\frac{M}{2}}^2\right)$$

as well as their para-conjugates $G_{M-1-k}(z^2)$ and $$G_{\frac{M}{2}-1-k}\left(z_{\frac{M}{2}}^2\right)$$

possess this property and thus can be grouped as shown in FIG. 8, where we define the vectors of transfer functions $$g_k\left(z_{\frac{M}{2}}^2\right) = \begin{bmatrix} G_k\left(z_{\frac{M}{2}}^2\right) \\ G_{k+\frac{M}{2}}\left(z_{\frac{M}{2}}^2\right) \end{bmatrix},$$

-continued $$g_{M-1-k}\left(z_{\frac{M}{2}}^2\right) = \begin{bmatrix} G_{M-1-k}\left(z_{\frac{M}{2}}^2\right) \\ G_{\frac{M}{2}-1-k}\left(z_{\frac{M}{2}}^2\right) \end{bmatrix}, k = 0, \ldots, \frac{M}{4} - 1.$$

We can see in FIG. 8 that it is necessary to reorganize the IDFT outputs. Moreover, for each polyphase component pair the outputs are added at the lower sampling rate. The delay that is necessary for the output of the polyphase component with highest index in each pair is transferred to the lower sampling rate and then to the front of the filter block. Finally, the outputs of the polyphase components pairs in FIG. 8 are serialized, different to FIG. 7 where instead of being directly serialized the outputs of the two power complementary polyphase components are added at the higher rate, resulting in a sort of block overlapping and add procedure. Now, the power complementary polyphase components pairs can be either implemented in a direct form as two separate transfer functions or they can be jointly implemented using, for example, a non-recursive lattice structure. A lattice structure provides several advantages like, for example, robustness to coefficient quantization, the hierarchical property, facilitate PR fulfilling design, etc. The lattice structure is composed of consecutive Givens rotations $R_{k,i}$, i=0, . . . , K−1, and delay sections $$\Lambda\left(z_{\frac{M}{2}}^2\right)$$

with $$R_{k,i} = \begin{bmatrix} \cos\Theta_{k,i} & \sin\Theta_{k,i} \\ -\sin\Theta_{k,i} & \cos\Theta_{k,i} \end{bmatrix}, \Lambda\left(z_{\frac{M}{2}}^2\right) = \begin{bmatrix} 1 & 0 \\ 0 & z_{\frac{M}{2}}^2 \end{bmatrix} = \begin{bmatrix} 1 & 0 \\ 0 & z_M^{-1} \end{bmatrix},$$

and $$g_k\left(z_{\frac{M}{2}}^2\right) = [\cos\Theta_{k,K-1} \ \sin\Theta_{k,K-1}]\Lambda\left(z_{\frac{M}{2}}^2\right) R_{k,K-2} \ldots \Lambda\left(z_{\frac{M}{2}}^2\right) R_{k,0},$$

$$g_{M-1-k}\left(z_{\frac{M}{2}}^2\right) = [\sin\Theta_{k,K-1} \ \cos\Theta_{k,K-1}]\Lambda\left(z_{\frac{M}{2}}^2\right) R_{k,K-2} \ldots \Lambda\left(z_{\frac{M}{2}}^2\right) R_{k,0},$$

where $k = 0, \ldots, \frac{M}{4} - 1$.

The lattice structure for each $$g_k\left(z_{\frac{M}{2}}^2\right)$$

is shown in FIG. 9. The rotation angles $\Theta_{k,i}$ can be found from the coefficients of the polyphase pairs in $$g_k\left(z_{\frac{M}{2}}^2\right)$$

by a successive polynomial degree reduction. In FIG. 10 shows the lattice structure for the pair $$g_{M-1-k}\left(z_{\frac{M}{2}}^2\right),$$

that has many similarities to the one in FIG. 9, like the same $\Theta_{k,i}$, for example. The reason for those similarities lie in the fact that the two transfer functions in $$g_{M-1-k}\left(z_{\frac{M}{2}}^2\right)$$

are para-conjugate of the ones in $$g_k\left(z_{\frac{M}{2}}^2\right).$$

Another important detail is that the last rotor in both cases has only one branch, to generate the single output. Now, if a full rotor is implemented in the last lattice stage, we would obtain a lattice structure with two inputs and two outputs. This 2×2 lattice structure is depicted in FIG. 11, where four different transfer functions are obtained and described by the transfer function matrix $$G_k\left(z_{\frac{M}{2}}^2\right) = \begin{bmatrix} G_k\left(z_{\frac{M}{2}}^2\right) & G_{\frac{M}{2}+k}\left(z_{\frac{M}{2}}^2\right) \\ G_{\frac{M}{2}-1-Kk}\left(z_{\frac{M}{2}}^2\right) & -G_{M-1-k}\left(z_{\frac{M}{2}}^2\right) \end{bmatrix}, k = 0, \ldots \frac{M}{4} - 1.$$

Here two pairs of power complementary polyphase components are implemented in one nonrecursive 2×2 lattice. The 2×2 lattice structure is one of the best known implementation of an orthogonal filter.

By considering again the structures in FIGS. 9 and 10, we can conclude that they contain more coefficient multiplications than if the two polyphase components are implemented separately in a direct form each. However, the full rotors can be modified in order to have only two multipliers each and, in addition to that, two multipliers for each polyphase component pair output. This low complexity lattice structure is presented in FIG. 12 for the 2×1 lattice, where $\kappa_k = \Pi_{i=0}^{K-1} \cos\Theta_{k,i}$.

Now the lattice rotors with only two multipliers reduce the complexity almost to the same as the direct form. We could say that structure for exponentially modulated SFBs based on the prototype polyphase decomposition of type 1 is the one in FIG. 8, with the polyphase components pairs either implemented in direct form or as 2×1 lattices as in FIG. 12. Furthermore, the same simplification of the rotors can be applied to the 2×2 lattice, resulting in the structure shown in FIG. 13. Although derived in a different way and following a parallel development in the literature, the Lapped transforms have a fast implementation that is based on an structure very similar to the lapped transform.

One alternative to the lattice structure of FIG. 11 that also reduces the complexity, and has similar advantages, is achieved with the so called lifting steps, or ladder structure, and it is presented in FIG. 14, where each rotor is now substituted by 3 multipliers.

We have shown until now structures of the SFB and only for the prototype polyphase decomposition of type 1. Similar structures can be derived based on polyphase decompositions of type 2 shown in FIG. 15, where the multipliers before the DFT are redefined to $$d' = dW_M = W_M^{\frac{P+1}{2}}$$

and for polyphase decompositions of type 3, as shown in FIG. 16. Finally, for the AFB there are equivalent corresponding structures for all three types of polyphase decompositions and for the pairs of polyphase components as direct form, low complexity lattice or lifting steps available.

Further embodiments are depicted in FIGS. 17, 18, 19, for the SFB based on polyphase decompositions of type 1, 2 and 3, and in FIGS. 20, 21, 22, for the AFB also based on polyphase decompositions of type 1, 2 and 3. Where for the structures based on type 2 decomposition we use the definition $$G'_k(z_M^2) = \begin{bmatrix} G_{M-1-k}(z_M^2) & G_{\frac{M}{2}-1-k}(z_M^2) \\ G_{\frac{M}{2}+k}(z_M^2) & -G_k(z_M^2) \end{bmatrix}, k = 0, \ldots, \frac{M}{4}-1.$$

The structures are based on the further development of the polyphase networks from FIG. 8 for the corresponding FB and decomposition type. As mentioned in the former section, because the prototype filter has a symmetric impulse response, there are pairs of polyphase components that have the same coefficients but in a reverse order. In other words they are pairs of paraconjugate filters. As shown in FIGS. 13 and 14, the 2×2 lattice or lifting structures provide four of the polyphase components. Now only M/4 such structures are necessary where each of them has 2(K+1) multipliers for the case of lattice and 3K for the case of lifting steps.

Issues related on how to connect the DFTs and IDFTs to the polyphase filters and to the polyphase matrix contents are discussed. We will focus here on the SFBs. First, the negative sign in one of the transfer functions in the matrix that is obtained automatically from the lattice structure. This is solved with the periodic sign inversion for even time instants represented by the multiplier $-1^{m+1}$. It can be shown that the impulse responses in the second row are applied in a time interleaving fashion and by this alternation of the samples sign, only the impulse response with the inversed sign is reverted to its original value.

The second issue is that the DFT or IFDT provide M outputs, but now only M/2 inputs exist in the polyphase network. It can be demonstrated that because of the special characteristics of the signals at the input of the DFT or IDFT, the outputs actually show a big redundancy. More specifically, half of the outputs are complex conjugated versions of the other half With this in mind, one can see that all the necessary signals are generated by half of the DFT or IDFT outputs. We just need to take the complex conjugate signal from one of the outputs of each polyphase sets. Since all coefficients of the polyphase components are real valued, this is equivalent to take the complex conjugate of the two input signals. This means that half of the outputs of the DFT or IDFT do not need to be calculated, reducing even more the total computational complexity. Similar issues exist for the AFB but in reversed order and the corresponding solutions can be seen in the structures proposed.

As we mentioned before, structures with similar complexity to the efficient lattice were developed for CMFBs and SMFBs and received the name fast extended lapped transforms. They were originally not derived as an extension of the polyphase decomposition of the prototype, but it is worth mention that they can be derived in similar way as shown here.

In some applications of exponentially MFBs, for example, wired and wireless communications, an additional filter, an equalizer or a precoder, has to be included before the OQAM de-staggering for each subchannel in the AFB or after the staggering in the SFB. One good example is the channel equalization in multicarrier modulation schemes, where one multitap filter is included before the OQAM demapping for each subcarrier in the AFB in order to compensate for the frequency selectivity of the channel. In FIG. 23 we have a new definition for the block $O_k'$, in the odd subchannel k that already includes the FIR equalizer. An equivalent scheme can be drawn for the even subchannels and a corresponding one for the SFB. We will concentrate here on the structure for odd k and only for the AFB.

In addition to the new polyphase network for AFB and SFB structures, we also can improve the subchannel processing, by making use of the real and imaginary staggering. Since there are operations involving real and imaginary part removal and downsampling, we can make use of some multirate processing identities to reduce the complexity.

If the subchannel filter is a single complex coefficient $\omega_k$, it can be jointly implemented with the OQAM de-staggering with the structure shown in FIG. 24, where $\omega_k = \omega_k^{(R)} + j\omega_k^{(I)}$. It is worth noting that the multipliers ds in the AFB structures shown before can always be incorporated into the subchannel equalizer.

However, the subchannel equalizers will be multitap in general, so we can decompose the into their polyphase components also. For each subchannel k we decompose the equalizer in two components as follows $$W_k(z_{\frac{M}{2}}^2) = V_{0,k}(z_{\frac{M}{2}}^2) + V_{1,k}(z_{\frac{M}{2}}^2) z_{\frac{M}{2}}^{-1}$$

with $V_{0,k}(z_M) = V_{0,k}^{(R)}(z_M) + jV_{0,k}^{(I)}(z_M)$, where $V_{0,k}^{(R)}(z_M)$ and $V_{0,k}^{(I)}(z_M)$ contain the real and imaginary parts of the coefficients of $V_{0,k}(z_M)$.

Now we are able to jointly realize the subchannel equalizers and the OQAM de-staggering as shown in FIG. 25 This subchannel filtering structure reduces to the half the number of multiplications per output sample.

As mentioned before it is trivial to show the corresponding structures for even k and for precoders in the SFB.

Furthermore, the proposed structures can be used for the following applications:

non-maximally decimated FBs, i.e. total down and upsampling factor lower than M in applications like sub-band coding, frequency domain equalization or spectrum sensing, oversampled transmultiplexers, i.e. total up and downsampling factor higher than M in applications like multicarrier systems (higher distance between subcarriers central frequencies). One of the most prominent being the in the literature so called Filtered Multitone (FMT), where the OQAM staggering is not used and the up and downsampling are done in one step, and systems where the filter banks vary with time, resulting in time-variant coefficients of the polyphase filters and of the subchannel filters.

In order to numerically compare the different polyphase filtering structures for exponentially MFBs, we need first to determine the complexity as function of K and M. As a figure of merit we consider the total number of multiplications, where in each of them one factor is purely real number, the coefficient, and the other is a complex signal.

The total number of multiplications of the polyphase filtering for the state-of-the-art structures by considering the three different possibilities for the realization of the polyphase components pairs is given by:

Direct form: KM

Low complexity lattice: $(2K+1)M/2=(K+0.5)M$

Lifting steps: $(3(K-1)+2)M/2=(3K-1)M/2$

For the proposed structures the two possibilities are given by:

Lattice $(2K+2)M/4=(K+1)M/2$

Lifting steps: $3KM/4$

It is worth noting that a direct form implementation of the polyphase components in the proposed architecture ends up with the same number of multipliers as in the state-of-the-art.

In Tables 1, 2, 3 and 4 the complexity achieved by the new proposed structures is shown in numbers for different number of subchannels M and different lengths of the prototype coefficients.

We can see that for very short prototypes (K=2) a reduction of 25% in the number of multiplications can be achieved. For very long prototypes (K=10 or K=20) a reduction of almost 50% can be achieved. For typical multicarrier applications (K=4) a reduction of almost 40% can be achieved.

TABLE 1

Number of multipliers for K = 2

| | K = 2 | | | | |
|---|---|---|---|---|---|
| | State of the art | | | invention | |
| M | Direct form | Lattice | Lifting Steps | Lattice | Lifting Steps |
| 128 | 256 | 320 | 320 | 192 | 192 |
| 256 | 512 | 640 | 640 | 384 | 384 |
| 512 | 1024 | 1280 | 1280 | 768 | 768 |
| 1024 | 2048 | 2560 | 2560 | 1536 | 1536 |
| 2048 | 4096 | 5120 | 5120 | 3072 | 3072 |

TABLE 2

Number of multipliers for K = 4

| | K = 4 | | | | |
|---|---|---|---|---|---|
| | State of the art | | | invention | |
| M | Direct form | Lattice | Lifting Steps | Lattice | Lifting Steps |
| 128 | 512 | 576 | 704 | 320 | 384 |
| 256 | 1024 | 1152 | 1408 | 640 | 768 |
| 512 | 2048 | 2304 | 2816 | 1280 | 1536 |
| 1024 | 4096 | 4608 | 5632 | 2560 | 3072 |
| 2048 | 8192 | 9216 | 11264 | 5120 | 6144 |

TABLE 3

Number of multipliers for K = 10

| | K = 10 | | | | |
|---|---|---|---|---|---|
| | State of the art | | | invention | |
| M | Direct form | Lattice | Lifting Steps | Lattice | Lifting Steps |
| 128 | 1280 | 1344 | 1856 | 704 | 960 |
| 256 | 2560 | 2688 | 3712 | 1408 | 1920 |
| 512 | 5120 | 5376 | 7424 | 2816 | 3840 |

TABLE 3-continued

Number of multipliers for K = 10

| | K = 10 | | | | |
|---|---|---|---|---|---|
| | State of the art | | | invention | |
| M | Direct form | Lattice | Lifting Steps | Lattice | Lifting Steps |
| 1024 | 10240 | 10752 | 14848 | 5632 | 7680 |
| 2048 | 20480 | 21504 | 29696 | 11264 | 15360 |

TABLE 4

Number of multipliers for K = 20

| | K = 20 | | | | |
|---|---|---|---|---|---|
| | State of the art | | | invention | |
| M | Direct form | Lattice | Lifting Steps | Lattice | Lifting Steps |
| 128 | 2560 | 2624 | 3776 | 1344 | 1920 |
| 256 | 5120 | 5248 | 7552 | 2688 | 3840 |
| 512 | 10240 | 10496 | 15104 | 5376 | 7680 |
| 1024 | 20480 | 20992 | 30208 | 10752 | 15360 |
| 2048 | 40960 | 41984 | 60416 | 21504 | 30720 |

The features disclosed in the application, the claims and the figures can be relevant for the implementation of embodiments in any combination with each other.

The invention claimed is:

1. A synthesis filter bank comprising:
   a transform module which is configured to receive a plurality of input signals, transform the plurality of input signals, and output a plurality of transformed signals;
   a plurality of filter modules, which are coupled to the transform module, and wherein each filter module of the plurality of filter modules is configured to receive two transformed signals from the transform module, process the two received transformed signals, and output two processed signals; and
   a parallel-to-serial module, which is coupled to the plurality of filter modules and which is configured to receive the processed signals from the plurality of filter modules, combine the received processed signals, and output a combined signal;
   wherein for each of the plurality of filter modules one of the two processed signals is complex conjugated before it is received by the parallel-to-serial module.

2. The synthesis filter bank of claim 1, wherein the plurality of filter modules is designed from an orthogonal prototype filter, wherein each filter module comprises a first filter and a second filter, wherein the second filter is a power complementary filter of the first filter such that the two received transformed signals are processed simultaneously.

3. The synthesis filter bank of claim 1, wherein for each even time index a negative sign is applied to one of the two processed signals before it is received by the parallel-to-serial module.

4. The synthesis filter bank of claim 1, wherein a number of the transformed signals which are received by the plurality of filter modules is half the number of input signals received by the transform module.

5. The synthesis filter bank of claim 1, wherein for each of the plurality of filter modules, one of the two transformed signals is delayed in time before being received by the respective filter module.

6. An analysis filter bank comprising:
a serial-to-parallel module which is configured to receive an input signal and divide the received input signal into a plurality of output signals;
a plurality of filter modules which are coupled to the serial-to-parallel module, wherein each filter module of the plurality of filter modules is configured to receive two output signals from the serial-to-parallel module, process the two received output signals, and output two processed signals; and
a transform module which is coupled to the plurality of filter modules and which is configured to receive the processed signals, transform the plurality of processed signals, and output a plurality of transformed signals;
wherein for each of the plurality of filter modules one of the two output signals is complex conjugated before it is received by the respective filter module.

7. The analysis filter bank of claim 6, wherein the plurality of filter modules is designed from an orthogonal prototype filter, wherein each filter module comprises a first filter and a second filter, wherein the second filter is a power complementary filter of the first filter such that the two received output signals are processed simultaneously.

8. The analysis filter bank of claim 6, wherein for each even time index a negative sign is applied to one of the two output signals before it is received by the respective filter module.

9. The analysis filter bank of claim 6, wherein for each of the plurality of filter modules, one of the two processed signals is delayed in time after being received by the serial-to-parallel module.

10. A filter bank comprising:
the synthesis filter bank of claim 1; and
an analysis filter bank comprising,
    a serial-to-parallel module which is configured to receive an input signal outputted by said synthesis filter bank and divide the received input signal into a plurality of output signals,
    a plurality of filter modules which are coupled to the serial-to-parallel module, wherein each filter module of the plurality of filter modules is configured to receive two output signals from the serial-to-parallel module, process the two received output signals, and output two processed signals, and
    a transform module which is coupled to the plurality of filter modules and which is configured to receive the processed signals, transform the plurality of processed signals, and output a plurality of transformed signals.

11. A method for operating a synthesis filter bank, the method comprising:
receiving a plurality of input signals by a transform module;
transforming, by the transform module, the plurality of input signals;
outputting, by the transform module, a plurality of transformed signals;
receiving, by a plurality of filter modules which are coupled to the transform module, the plurality of transformed signals, wherein each filter module of the plurality of filter modules is configured to receive two transformed signals from the transform module;
processing, by each of the plurality of filter modules, the two received transformed signals;
outputting, by each of the plurality of filter modules, two processed signals;
complex conjugating, for each of the plurality of filter modules, one of the two processed signals before it is received by the parallel-to-serial module,
receiving, by a parallel-to-serial module which is coupled to the plurality of filter modules, the processed signals;
combining, by the parallel-to-serial module, the received processed signals; and
outputting, by the parallel-to-serial module, a combined signal.

12. A method for operating an analysis filter bank, the method comprising:
receiving, by a serial-to-parallel module, an input signal;
dividing, by the serial-to-parallel module, the received input signal into a plurality of output signals;
receiving, by a plurality of filter modules which are coupled to the serial-to-parallel module, the plurality of output signals, wherein each filter module of the plurality of filter modules is configured to receive two output signals from the serial-to-parallel module;
complex conjugating, for each of the plurality of filter modules, one of the two output signals before it is received by the respective filter module,
processing, by each of the plurality of filter modules, the two received output signals;
outputting, by each of the plurality of filter modules, two processed signals;
receiving, by a transform module which is coupled to the plurality of filter modules, the processed signals;
transforming, by the transform module, the processed signals; and
outputting, by the transform module, a plurality of transformed signals.

13. A filter bank comprising:
the analysis filter bank of claim 12; and
a synthesis filter bank comprising,
    a transform module which is configured to receive a plurality of input signals outputted by said analysis filter bank, transform the plurality of input signals, and output a plurality of transformed signals,
    a plurality of filter modules, which are coupled to the transform module, and wherein each filter module of the plurality of filter modules is configured to receive two transformed signals from the transform module, process the two received transformed signals, and output two processed signals, and
    a parallel-to-serial module, which is coupled to the plurality of filter modules and which is configured to receive the processed signals from the plurality of filter modules, combine the received processed signals, and output a combined signal.

14. A synthesis filter bank, comprising:
a transform module which is configured to receive a plurality of input signals, transform the plurality of input signals, and output a plurality of transformed signals,
a plurality of filter modules, which are coupled to the transform module, and wherein each filter module of the plurality of filter modules is configured to receive two transformed signals from the transform module, process the two received transformed signals and output two processed signals, and
a parallel-to-serial module which is coupled to the plurality of filter modules and which is configured to receive the processed signals from the plurality of filter modules, combine the received processed signals and output a combined signal;

wherein for each even time index a negative sign is applied to one of the two processed signals before it is received by the parallel-to-serial module.

15. The synthesis filter bank of claim 14, wherein the plurality of filter modules is designed from an orthogonal prototype filter, wherein each filter module comprises a first filter and a second filter, wherein the second filter is a power complementary filter of the first filter such that the two received transformed signals are processed simultaneously.

16. The synthesis filter bank of claim 14, wherein a number of the transformed signals which are received by the plurality of filter modules is half the number of input signals received by the transform module.

17. The synthesis filter bank of claim 14, wherein for each of the plurality of filter modules, one of the two transformed signals is delayed in time before being received by the respective filter module.

18. An analysis filter bank, comprising:
a serial-to-parallel module which is configured to receive an input signal and divide the received input signal into a plurality of output signals,
a plurality of filter modules which are coupled to the serial-to-parallel module, wherein each filter module of the plurality of filter modules is configured to receive two output signals from the serial-to-parallel module, process the two received output signals and output two processed signals, and
a transform module which is coupled to the plurality of filter modules and which is configured to receive the processed signals, transform the plurality of processed signals, and output a plurality of transformed signals;
wherein for each even time index a negative sign is applied to one of the two output signals before it is received by the respective filter module.

19. The analysis filter bank of claim 18, wherein the plurality of filter modules is designed from an orthogonal prototype filter, wherein each filter module comprises a first filter and a second filter, wherein the second filter is a power complementary filter of the first filter such that the two received output signals are processed simultaneously.

20. The analysis filter bank of claim 18, wherein for each of the plurality of filter modules, one of the two processed signals is delayed in time after being received by the serial-to-parallel module.

21. A synthesis filter bank, comprising:
a transform module which is configured to receive a plurality of input signals, transform the plurality of input signals, and output a plurality of transformed signals,
a plurality of filter modules, which are coupled to the transform module, and wherein each filter module of the plurality of filter modules is configured to receive two transformed signals from the transform module, process the two received transformed signals and output two processed signals, and
a parallel-to-serial module which is coupled to the plurality of filter modules and which is configured to receive the processed signals from the plurality of filter modules, combine the received processed signals and output a combined signal;
wherein for each of the plurality of filter modules, one of the two transformed signals is delayed in time before being received by the respective filter module.

22. The synthesis filter bank of claim 21, wherein the plurality of filter modules is designed from an orthogonal prototype filter, wherein each filter module comprises a first filter and a second filter, wherein the second filter is a power complementary filter of the first filter such that the two received transformed signals are processed simultaneously.

23. The synthesis filter bank of claim 21, wherein a number of the transformed signals which are received by the plurality of filter modules is half the number of input signals received by the transform module.

24. An analysis filter bank, comprising:
a serial-to-parallel module which is configured to receive an input signal and divide the received input signal into a plurality of output signals,
a plurality of filter modules which are coupled to the serial-to-parallel module, wherein each filter module of the plurality of filter modules is configured to receive two output signals from the serial-to-parallel module, process the two received output signals and output two processed signals, and
a transform module which is coupled to the plurality of filter modules and which is configured to receive the processed signals, transform the plurality of processed signals, and output a plurality of transformed signals;
wherein for each of the plurality of filter modules, one of the two processed signals is delayed in time after being received by the serial-to-parallel module.

25. The analysis filter bank of claim 24, wherein the plurality of filter modules is designed from an orthogonal prototype filter, wherein each filter module comprises a first filter and a second filter, wherein the second filter is a power complementary filter of the first filter such that the two received output signals are processed simultaneously.

26. A filter bank comprising:
the synthesis filter bank of claim 14; and
an analysis filter bank, comprising,
a serial-to-parallel module which is configured to receive an input signal outputted by said synthesis filter bank and divide the received input signal into a plurality of output signals,
a plurality of filter modules which are coupled to the serial-to-parallel module, wherein each filter module of the plurality of filter modules is configured to receive two output signals from the serial-to-parallel module, process the two received output signals and output two processed signals, and
a transform module which is coupled to the plurality of filter modules and which is configured to receive the processed signals, transform the plurality of processed signals, and output a plurality of transformed signals.

27. A filter bank comprising:
the synthesis filter bank of claim 21; and
an analysis filter bank, comprising,
a serial-to-parallel module which is configured to receive an input signal outputted by said synthesis filter bank and divide the received input signal into a plurality of output signals,
a plurality of filter modules which are coupled to the serial-to-parallel module, wherein each filter module of the plurality of filter modules is configured to receive two output signals from the serial-to-parallel module, process the two received output signals and output two processed signals, and
a transform module which is coupled to the plurality of filter modules and which is configured to receive the processed signals, transform the plurality of processed signals, and output a plurality of transformed signals.

28. A method for operating a synthesis filter bank, comprising:

receiving a plurality of input signals by a transform module, transforming, by the transform module, the plurality of input signals, outputting, by the transform module, a plurality of transformed signals, receiving, by a plurality of filter modules which are coupled to the transform module, the plurality of transformed signals, wherein each filter module of the plurality of filter modules is configured to receive two transformed signals from the transform module, processing, by each of the plurality of filter modules, the two received transformed signals, outputting, by each of the plurality of filter modules, two processed signals, applying a negative sign, for each even time index, one of the two processed signals before it is received by the parallel-to-serial module, receiving, by a parallel-to-serial module which is coupled to the plurality of filter modules, the processed signals, combining, by the parallel-to-serial module, the received processed signals, and outputting, by the parallel-to-serial module, a combined signal.

29. A method for operating a synthesis filter bank, comprising receiving a plurality of input signals by a transform module, transforming, by the transform module, the plurality of input signals, outputting, by the transform module, a plurality of transformed signals, receiving, by a plurality of filter modules which are coupled to the transform module, the plurality of transformed signals, wherein each filter module of the plurality of filter modules is configured to receive two transformed signals from the transform module, wherein for each of the plurality of filter modules, one of the two transformed signals is delayed in time before being received by the respective filter module, processing, by each of the plurality of filter modules, the two received transformed signals, outputting, by each of the plurality of filter modules, two processed signals, receiving, by a parallel-to-serial module which is coupled to the plurality of filter modules, the processed signals, combining, by the parallel-to-serial module, the received processed signals, and outputting, by the parallel-to-serial module, a combined signal.

30. A method for operating an analysis filter bank, comprising:

receiving, by a serial-to-parallel module, an input signal, dividing, by the serial-to-parallel module, the received input signal into a plurality of output signals, applying a negative sign, for each even time index, one of the two output signals before it is received by the respective filter module, receiving, by a plurality of filter modules which are coupled to the serial-to-parallel module, the plurality of output signals, wherein each filter module of the plurality of filter modules is configured to receive two output signals from the serial-to-parallel module, processing, by each of the plurality of filter modules, the two received output signals, outputting, by each of the plurality of filter modules, two processed signals, receiving, by a transform module which is coupled to the plurality of filter modules, the processed signals, transforming, by the transform module, the processed signals, and outputting, by the transform module, a plurality of transformed signals.

31. A method for operating an analysis filter bank, comprising:

receiving, by a serial-to-parallel module, an input signal, dividing, by the serial-to-parallel module, the received input signal into a plurality of output signals, applying a negative sign, for each even time index, one of the two output signals before it is received by the respective filter module, receiving, by a plurality of filter modules which are coupled to the serial-to-parallel module, the plurality of output signals, wherein each filter module of the plurality of filter modules is configured to receive two output signals from the serial-to-parallel module, wherein for each of the plurality of filter modules, one of the two transformed signals is delayed in time after being received by the serial-to-parallel module, processing, by each of the plurality of filter modules, the two received output signals, outputting, by each of the plurality of filter modules, two processed signals, receiving, by a transform module which is coupled to the plurality of filter modules, the processed signals, transforming, by the transform module, the processed signals, and outputting, by the transform module, a plurality of transformed signals.

32. A filter bank comprising:

the analysis filter bank of claim 18; and an synthesis filter bank, comprising, a transform module which is configured to receive a plurality of input signals outputted by said analysis filter bank, transform the plurality of input signals, and output a plurality of transformed signals, a plurality of filter modules, which are coupled to the transform module, and wherein each filter module of the plurality of filter modules is configured to receive two transformed signals from the transform module, process the two received transformed signals and output two processed signals, and a parallel-to-serial module which is coupled to the plurality of filter modules and which is configured to receive the processed signals from the plurality of filter modules, combine the received processed signals and output a combined signal.

33. A filter bank comprising:

the analysis filter bank of claim 24;

an synthesis filter bank, comprising, a transform module which is configured to receive a plurality of input signals outputted by said analysis filter bank, transform the plurality of input signals, and output a plurality of transformed signals, a plurality of filter modules, which are coupled to the transform module, and wherein each filter module of the plurality of filter modules is configured to receive two transformed signals from the transform module, process the two received transformed signals and output two processed signals, and a parallel-to-serial module which is coupled to the plurality of filter modules and which is configured to receive the processed signals from the plurality of filter modules, combine the received processed signals and output a combined signal.

* * * * *

UNITED STATES PATENT AND TRADEMARK OFFICE
CERTIFICATE OF CORRECTION

PATENT NO. : 10,594,531 B2
APPLICATION NO. : 16/076957
DATED : March 17, 2020
INVENTOR(S) : Leonardo Gomes Baltar et al.

It is certified that error appears in the above-identified patent and that said Letters Patent is hereby corrected as shown below:

In the Claims

At Column 16, Line 3, "module," should be -- module; --.

At Column 16, Line 23, "module," should be -- module; --.

Signed and Sealed this
Twenty-fifth Day of August, 2020

Andrei Iancu
*Director of the United States Patent and Trademark Office*